US009322354B2

(12) United States Patent
Nishida et al.

(10) Patent No.: US 9,322,354 B2
(45) Date of Patent: Apr. 26, 2016

(54) IN-VEHICLE ENGINE CONTROL DEVICE AND CONTROL METHOD THEREOF

(71) Applicant: Mitsubishi Electric Corporation, Chiyoda-ku, Tokyo (JP)

(72) Inventors: Mitsunori Nishida, Tokyo (JP); Osamu Nishizawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 433 days.

(21) Appl. No.: 14/017,987

(22) Filed: Sep. 4, 2013

(65) Prior Publication Data

US 2014/0316679 A1 Oct. 23, 2014

(30) Foreign Application Priority Data

Apr. 18, 2013 (JP) ................................ 2013-087082

(51) Int. Cl.

| | |
|---|---|
| ***G06F 7/00*** | (2006.01) |
| ***G06F 17/00*** | (2006.01) |
| ***F02M 51/00*** | (2006.01) |
| ***F02D 41/28*** | (2006.01) |
| *F02D 41/20* | (2006.01) |

(52) U.S. Cl.

CPC ................ *F02D 41/28* (2013.01); *F02D 41/20* (2013.01); *F02D 2041/201* (2013.01); *F02D 2041/2003* (2013.01); *F02D 2041/2006* (2013.01); *F02D 2041/2013* (2013.01); *F02D 2041/2051* (2013.01); *F02D 2041/2058* (2013.01)

(58) Field of Classification Search

CPC ............ F02D 41/20; F02D 2041/2003; F02D 2041/2006; F02D 2041/201; F02D 2041/2013; F02D 2041/2017; F02D 2041/2051; F02D 2041/2058; F02D 41/28

USPC ........... 701/102–105; 123/480, 490; 323/284, 323/285, 288–290; 361/152

See application file for complete search history.

(56) References Cited

U.S. PATENT DOCUMENTS

| | | | | |
|---|---|---|---|---|
| 6,766,789 | B2 * | 7/2004 | Yamakado ............. | F02D 41/20 123/387 |
| 8,018,216 | B2 * | 9/2011 | Kakehi .................. | F02D 41/20 323/266 |
| 8,081,498 | B2 * | 12/2011 | Mayuzumi ............. | F02D 41/20 123/490 |

(Continued)

FOREIGN PATENT DOCUMENTS

| | | |
|---|---|---|
| JP | 2005-163625 A | 6/2005 |
| JP | 2010-041800 A | 2/2010 |

*Primary Examiner* — Hung Q Nguyen
*Assistant Examiner* — David Hamaoui
(74) *Attorney, Agent, or Firm* — Sughrue Mion, PLLC; Richard C. Turner

(57) ABSTRACT

In an inductive element which is intermittently excited by a boosting opening and closing element and charges a high-voltage capacitor to a high voltage, an inductive element current proportional to a voltage across both ends of a current detection resistor and a boosted detection voltage which is a divided voltage of the high-voltage capacitor are input to a boosting control circuit portion via a high-speed A/D converter provided in an arithmetic and control circuit unit. The boosting control circuit portion adjusts the inductive element current so as to be suitable for the time from the present rapid excitation to the next rapid excitation, and controls opening and closing of the boosting opening and closing element so as to obtain a targeted boosted high voltage which is variably set by a microprocessor of an arithmetic and control circuit unit.

12 Claims, 9 Drawing Sheets

(56) References Cited

U.S. PATENT DOCUMENTS 8,514,541 B2 * 8/2013 Hatanaka ................ F02D 41/20 361/152
8,776,763 B2 * 7/2014 Omori ..................... F02D 41/20 123/445
2002/0070721 A1 * 6/2002 Ostrom ..................... G05F 1/56 323/284
2012/0318883 A1 * 12/2012 Kusakabe ............... F02D 41/20 239/1
2014/0067233 A1 * 3/2014 Nishida ................... F02D 41/20 701/103

* cited by examiner

FIG.4

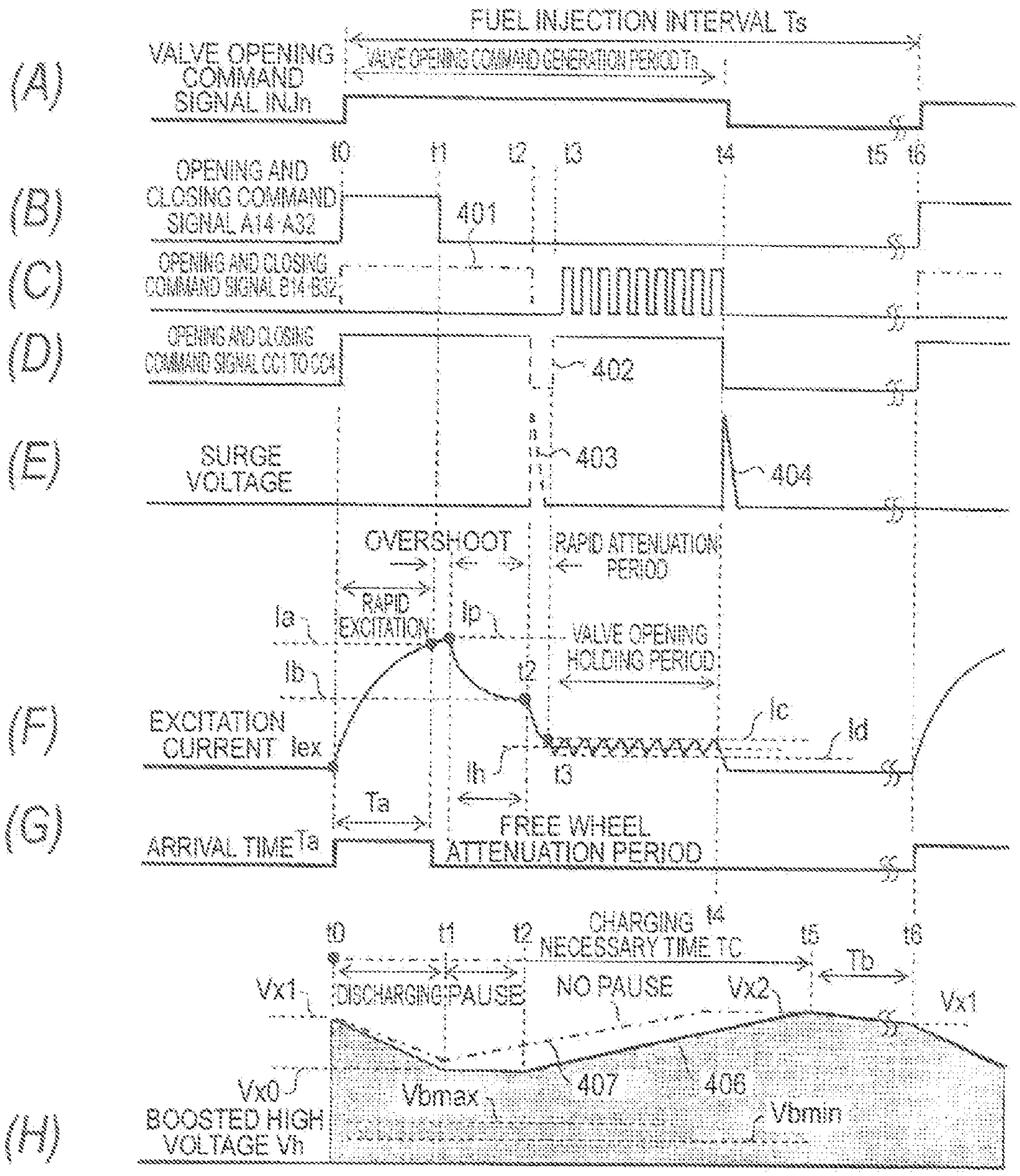

Iex EXCITATION CURRENT
Ia SET CUTOFF CURRENT
Ip ACTUALLY MEASURED PEAK CURRENT (OVERSHOOT CURRENT)
Ib SET ATTENUATION CURRENT
Ic SET FALLING INVERSION HOLDING CURRENT
Id SET RISING INVERSION HOLDING CURRENT
Ih VALVE OPENING HOLDING CURRENT
Vbmax BATTERY VOLTAGE (MAXIMUM)
Vbmin BATTERY VOLTAGE (MINIMUM)
Vx2 TARGET HIGHER-SIDE VOLTAGE
Vx1 TARGET LOWER-SIDE VOLTAGE
Vx0 MINIMUM VOLTAGE
Ta ACTUALLY MEASURED ARRIVAL TIME
Tb CHARGING ALLOWANCE TIME Tb=Ts-Tc
Tc CHARGING NECESSARY TIME
Tn VALVE OPENING COMMAND GENERATION PERIOD
Ts FUEL INJECTION INTERVAL

IN-VEHICLE ENGINE CONTROL DEVICE AND CONTROL METHOD THEREOF

BACKGROUND OF THE INVENTION

1. Field of the Invention

This invention relates to an in-vehicle engine control device which rapidly excites an electromagnetic coil for driving a solenoid valve by using a boosting circuit unit which generates a high voltage from an in-vehicle battery and then performs valve-opening holding control by using a voltage of the in-vehicle battery, in order to drive the solenoid valve for fuel injection of an internal combustion engine at high speed, and particularly to an in-vehicle engine control device including an improved boosting circuit unit for obtaining a boosted high voltage and a control method thereof.

2. Description of the Background Art

There is an in-vehicle engine control device which sequentially generates valve opening command signals to a plurality of electromagnetic coils which are respectively provided for cylinders of a multi-cylinder engine and drive a fuel injection solenoid valve by using a microprocessor which is operated according to a crank angle sensor, so as to sequentially selectively set valve opening time and valve opening period, and performs rapid excitation control and valve opening holding control by using an solenoid valve driving control circuit unit so as to perform rapid valve opening and valve opening holding of the solenoid valve. In this in-vehicle engine control device, it is well known that a value of a boosted high voltage generated by the boosting circuit unit which determines a high-speed valve opening performance of the solenoid valve is variably adjusted according to a fuel pressure, a value of an intermittently driven current for an inductive element provided in the boosting circuit unit is variably adjusted according to engine speed or a battery voltage, an output voltage of the boosting circuit unit is automatically adjusted such that an actual voltage applied to the electromagnetic coil becomes a predetermined high voltage, or a boosted high voltage is automatically adjusted such that a peak current which flows through the electromagnetic coil becomes a predetermined target current. In these well-known examples, targeted rapid excitation control and valve-opening holding control are performed by detecting an excitation current for the fuel injection electromagnetic coil, detecting a boosted voltage of the boosting circuit unit, or detecting a driving current of the boosting inductive element.

For example, according to FIG. 1 of PTL 1, entitled "fuel injection valve control device", a microcomputer 12 detects a peak current Ip which flows through fuel injection electromagnetic solenoids INJ1 and INJn during a rapid excitation period by using a current detection resistor R10, adjusts a conduction duty cycle of a MOS transistor MN1 depending on a difference from a target peak current Ip0, and charges a capacitor C1 by intermitting a current of a boosting inductor L1 (boosting inductive element). In addition, the microcomputer 12 monitors a divided voltage V1 of a voltage across both ends of the capacitor C1, and adjusts a conduction duty cycle such that a predetermined target voltage for obtaining the targeted peak current Ip0) can be obtained. Thereby, it is possible to reliably perform appropriate fuel injection at engine speed from a low speed zone to a high speed zone. In this example, an excitation current of the electromagnetic solenoid (electromagnetic coil) is detected using the current detection resistor so as to be input to the microcomputer, and a boosted high voltage is divided by a dividing resistor so as to be input to the microcomputer, but a driving current for the boosting inductive element is not detected.

In addition, according to FIG. 1 of PTL 2, entitled "boosting power supply device", in a circuit in which a coil 2 to which a power supply voltage VB is supplied, a transistor 3, and a current detection resistor 4 are connected in series, a series circuit of a charging diode 6 and a capacitor 5 is connected in parallel to the transistor 3, a driving current Is flowing to the coil 2 when the transistor 3 is closed and a charging current Ic flowing to the capacitor 5 from the coil 2 when the transistor 3 is opened flow through the current detection resistor 4. Therefore, the boosting power supply device 1 opens the transistor 3 when the driving current Is increases to a higher-side current threshold value iH and closes the transistor when the charging current Ic decreases to a lower-side current threshold value iL. In addition, when a power supply voltage or engine speed is reduced, the higher-side current threshold value iH decreases, and the lower-side current threshold value iL increases. Thereby, an increase range of the driving current Is is reduced so as to suppress an increase in temperature of the boosting power supply device. In this example, detection of an excitation current of the electromagnetic solenoid (electromagnetic coil) is not disclosed, but a current of the coil 2 which is a boosting inductive element and a boosted high voltage are detected, and both of the two are treated as input signals for an analog comparison circuit. Thus, a microcomputer 17 numerically records threshold values set for registers 28 and 29 or 54 and 55 (refer to FIG. 2 or FIG. 11) in threshold value changing circuits 15 and 51.

CITATION LIST

Patent Literature

PTL 1: JP-A-2005-163625 (FIGS. 1 and 2, Abstract, and paragraphs [0034] and [0035])

PTL 2: JP-A-2010-041800 (FIGS. 1, 2 and 11, and Abstract)

(1) Problems of the Related Art

As is clear when referring to a time chart of FIG. 2 and a description thereof, in the fuel injection valve control device disclosed in PTL 1, an excitation current for the electromagnetic solenoid arrives at a peak value and starts to be attenuated between the time points t0 and t1 when a transistor Q1 for applying a high voltage is closed. Therefore, a variation in the excitation current is smooth, and thereby a variation gradient is slight, particularly, around the peak point, even if there are errors in measurement timing. Therefore, the fuel injection valve control device has a feature in which it is difficult for a detection error of a peak current to occur. This is because a resistance of the electromagnetic solenoid is large, and a difference voltage between a residual voltage of the capacitor and a voltage drop in the electromagnetic solenoid is decreased due to an increase in the excitation current. However, when there is an error in arrival time of a peak value even if the peak value is the same, there is a problem in that a fuel injection characteristic fluctuates. For this reason, if a resistance of the electromagnetic solenoid is made to be small so as to rapidly increase the excitation current, and thereby the excitation current arrives at a predetermined set cutoff current so as to open the transistor Q1 for applying a high voltage, there is an advantage in which time for arriving at a targeted set cutoff current is reduced and thus a fluctuation error thereof is reduced, but there is a background in which it is difficult to detect the excitation current which rapidly varies using a multi-channel A/D converter which is operated at low speed.

On the other hand, in PTL 1, a transistor MN1 which intermittently excites the boosting inductive element is driven so as to be opened and closed in response to a PWM signal with a variable duty cycle which is generated by the microcomputer 12, and thus there is a problem in that a current flowing through the boosting inductive element varies depending on a fluctuation in a power supply voltage or a fluctuation in a resistance of the inductive element caused by temperature even in the same on and off ratio, a boosted high voltage fluctuates even if an on and off ratio is constant, and thereby the fuel injection characteristic fluctuates. In addition, in a case where engine speed is low and there is sufficient allowance time for charging, it is effective to increase a frequency of the PWM signal by decreasing an on and off ratio, but this is difficult since a driving current of the inductive element is not detected in the fuel injection valve control device disclosed in PTL 1, and thus there is a problem in that an increase in temperature of the inductive element cannot be suppressed.

Next, the "boosting power supply device" disclosed in PTL 2 is constituted by a hardware logic using an analog comparison circuit, and, for this reason, there is an advantage in that the microcomputer is not required to read a current of the inductive element 2 which fluctuates at a high frequency, and merely sets numerical values of the higher-side current threshold value iH and the lower-side current threshold value iL. In addition, according to the description of paragraph [0050], a charging control circuit 16 monitors a charged voltage VC of the capacitor 5, and allows the transistor 3 to be opened and closed via an AND circuit 13. Therefore, a monitoring signal of a boosted high voltage is not input to the microcomputer 17, and a value of the boosted high voltage is fixed to a predetermined constant value set by the charging control circuit 16 so as not to be variably adjusted. Therefore, there is a problem in that the fuel injection characteristic fluctuates depending on a temperature fluctuation of the electromagnetic solenoid.

On the other hand, in PTL 2, when a power supply voltage or engine speed is lowered, a temperature increase of the boosting power supply device is intended to be suppressed by decreasing the higher-side current threshold value iH and increasing the lower-side current threshold value iL so as to reduce an increase range of the driving current Is; however, in relation to the magnitude of the driving current, not only a power supply voltage but also an influence of a resistance variation caused by temperature of the inductive element is a major fluctuation factor, and it is problematic to set an increase range of the driving current Is by using, for example, a two-element map formed only by the power supply voltage and the engine speed. For example, since a resistance of the inductive element is small at the time of starting at low temperature, an increase time of a driving current is shortened, thus time required for completion of charging of the capacitor multiple times is shortened, and thereby the allowance time to the next fuel injection is lengthened. However, during high-speed driving for along time, a resistance increases and thereby the allowance time is shortened. Therefore, there is a problem in that heat generation of the inductive element cannot be effectively suppressed unless an increase range of the driving current is changed based on a power supply voltage, engine speed, and temperature (resistance) of the inductive element. Further, as shown in FIG. 11, even if an increase range is set without steps, it is difficult how to determine an increase range of the driving current Is, and if a boosted high voltage is to be variably adjusted, the difficulty thereof further increases.

SUMMARY OF THE INVENTION

(2) Object of the Invention

A first object of this invention is to provide an in-vehicle engine control device including a boosting circuit unit which can provide a stable fuel injection characteristic, suppress a temperature increase of a boosting inductive element, allow a target value of a driving current of the boosting inductive element and a target value of a boosted high voltage which is a charged voltage of a high-voltage capacitor to be easily variably set, and does not give a high-speed control burden to a microprocessor. A second object of this invention is to provide an in-vehicle engine control method capable of suppressing a temperature increase by reducing a driving current of a boosting inductive element to be as small as possible according to actual driving circumstances, and reliably achieving a targeted boosted high voltage until the next fuel injection is performed.

According to an aspect of this invention, there is provided an in-vehicle engine control device according to this invention including an solenoid valve driving control circuit unit for a plurality of electromagnetic coils for driving solenoid valves in order to sequentially drive the solenoid valves for fuel injection provided in respective cylinders of a multi-cylinder engine; a boosting circuit unit that generates a boosted high voltage for performing rapid excitation on the electromagnetic coils; an arithmetic and control circuit unit that has a microprocessor as a main constituent element; and an injection control circuit unit that performs relay between the microprocessor and the solenoid valve driving control circuit unit, in which the arithmetic and control circuit unit includes a multi-channel A/D converter that is operated at low speed, cooperating with the microprocessor; a high-speed A/D converter with a plurality of channels; and a boosting control circuit portion, in which the microprocessor determines generation moments of valve opening command signals INJn for the electromagnetic coils and a valve opening command generation period Tn on the basis of signal voltages of at least some of an air flow sensor, an accelerator position sensor, and a fuel pressure sensor included in a low-speed analog sensor group, which are input to the multi-channel A/D converter, and operations of a crank angle sensor and an engine speed sensor of an opening and closing sensor group, in which the boosting circuit unit includes an inductive element that is intermittently excited by a boosting opening and closing element from an in-vehicle battery; a current detection resistor that is connected in series to the inductive element; and a high-voltage capacitor that is charged by releasing electromagnetic energy stored in the inductive element via a charging diode when an inductive element current Ix proportional to a voltage across both ends of the current detection resistor is input to the arithmetic and control circuit unit, the boosting opening and closing element is controlled so as to be opened and closed in response to a boosting control signal Ex generated by the boosting control circuit portion, and the boosting opening and closing element is opened, in which a divided voltage of the voltage across both ends of the high-voltage capacitor is input to the arithmetic and control circuit unit as a boosted detection voltage Vx, an analog signal voltage proportional to the inductive element current Ix and the boosted detection voltage Vx is input to the high-speed A/D converter, and data which is digitally converted by the high-speed A/D converter is stored in a current present value register and a voltage present value register, in which the boosting control circuit portion includes a higher-side current set register and a higher-side voltage set register that are transmitted from the microprocessor so as to be set; a higher-side current comparator and a higher-side voltage comparator that respectively compare the magnitudes of numerical values stored in the set registers and numerical values stored in the current present value register and voltage present value register; and a logical circuit portion, in which the logical circuit portion compares a value of a target higher-side current Ix2 stored in the higher-side current set register with a value of the inductive element current Ix transmitted from the boosting circuit unit by the higher-side current comparator, and when the value of the inductive element current Ix is smaller than the value of the target higher-side current Ix2, the logical circuit portion activates the boosting control signal Ex such that the boosting opening and closing element is driven so as to be closed, in which the logical circuit portion compares a value of a target higher-side voltage Vx2 stored in the higher-side voltage set register with a value of the boosted detection voltage Vx transmitted from the boosting circuit unit by using the higher-side voltage comparator, and when the value of the boosted detection voltage Vx is smaller than the value of the target higher-side voltage Vx2, the logical circuit portion makes the boosting control signal Ex valid such that the boosting opening and closing element is driven so as to be closed, and in which the arithmetic and control circuit unit is divided into a data processing function of setting numerical values of the target higher-side current Ix2 and the target higher-side voltage Vx2 in the boosting circuit unit by using the microprocessor and converting numerical values of the inductive element current Ix and boosted detection voltage Vx by using the high-speed A/D converter, and a digital logic control function of performing negative feedback control so as to obtain a relationship in which a target value as which the numerical value is set is the same as a monitored present value into which the numerical value is converted, by using the boosting control circuit portion.

In addition, according to another aspect of this invention, an in-vehicle engine control method is a control method using the in-vehicle engine control device according to the aspect, in which the boosting control circuit portion measures a charging necessary time Tc after the valve opening command signals INJn are generated until a charged voltage of the high-voltage capacitor of the boosting circuit unit is reduced to the minimum voltage Vx0 due to rapid excitation for the electromagnetic coils and arrives at the target higher-side voltage Vx2 through recharging by using a boosting period measurement timer, or measures a charging allowance time Tb after the charged voltage arrives at the target higher-side voltage Vx2 until the next valve opening command signals INJn are generated by using a standby time measurement timer, in which the program memory cooperating with the microprocessor includes a control program which is current reduction adjusting means, in which the current reduction adjusting means calculates the present charging allowance time Tb based on a deviation Ts−Tc between the charging necessary time Tc previously measured by the boosting period measurement timer and a fuel injection interval Is until the next valve opening command signals INJn are generated, or reads the previous charging allowance time Tb measured standby time measurement timer so as to calculate the present charging allowance time Tb corresponding to the present fuel injection interval Ts, and in which the current reduction adjusting means corrects a value of the target higher-side current Ix2 transmitted to the higher-side current set register so as to be decreased when the present charging allowance time Tb is equal to or more than a predetermined value, corrects a value of the target higher-side current Ix2 so as to be increased when the present charging allowance time Tb is smaller than a predetermined value, and performs charging of the high-voltage capacitor by using a suppression target higher-side current Ix20.

The in-vehicle engine control device according to the aspect of this invention includes a solenoid valve driving control circuit unit for a plurality of electromagnetic coils for driving solenoid valves, a boosting circuit unit, an arithmetic and control circuit unit, and an injection control circuit unit. The arithmetic and control circuit unit includes a multi-channel A/D converter that is operated at low speed, cooperating with a microprocessor, a high-speed A/D converter with a plurality of channels, and a boosting control circuit portion. The boosting control circuit portion includes a plurality of numerical value comparators and a logical circuit portion. The arithmetic and control circuit unit is divided into a data processing function of setting numerical values of a target supply current for a boosting inductive element of the boosting circuit unit and a target boosted voltage of a high-voltage capacitor charged to a boosted voltage, and converting numerical values of an inductive element current and boosted detection voltage, and a digital logic control function of performing negative feedback control such that a target value as which the numerical value is set is the same as a monitored present value into which the numerical value is converted. Therefore, there is an effect in which the microprocessor can easily adjust set data which is a control constant value by using a set register, and the boosting control circuit portion controls opening and closing of a boosting opening and closing element which performs opening and closing operations at a high frequency so as to alleviate a high-speed control burden on the microprocessor, improves control accuracy of fuel injection control by adjusting the boosted high voltage, and adjusts an inductive element current suitable for a targeted boosted high voltage, thereby performing control so as to obtain a boosted high voltage which constantly varies within a predetermined period.

In addition, in the in-vehicle engine control method according to another aspect of this invention, recharging of the high-voltage capacitor is completed after the electromagnetic coils for fuel injection are rapidly excited, a charging allowance time until the next rapid excitation is performed is measured, and a target higher-side current for the inductive element is adjusted so as to be increased or decreased according to a degree of the present charging allowance time. Therefore, there is an effect in which, in a case where the engine speed is low and a fuel injection interval Ts from the previous fuel injection to the next fuel injection is long, the high-voltage capacitor is not required to be rapidly charged, and thus a target higher-current is suppressed so as to suppress power consumption in the boosting circuit unit, thereby reducing a temperature increase of circuit parts. In addition, since a charging necessary time Tc of the high-voltage capacitor fluctuates so as to increase or decrease in inverse proportion to a power supply voltage of the in-vehicle battery, and fluctuates depending on a temperature of the inductive element, and the fuel injection interval Is fluctuates in inverse proportion to the engine speed, a target higher-side current can be accurately set by measuring the charging necessary time Tc or the charging allowance time Tb as learning information.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 4 is a time chart illustrating an operation of the in-vehicle engine control device shown in FIG. 1.

DETAILED DESCRIPTION OF THE INVENTION

Embodiment 1

(1) Detailed Description of Configuration

Figure 1:
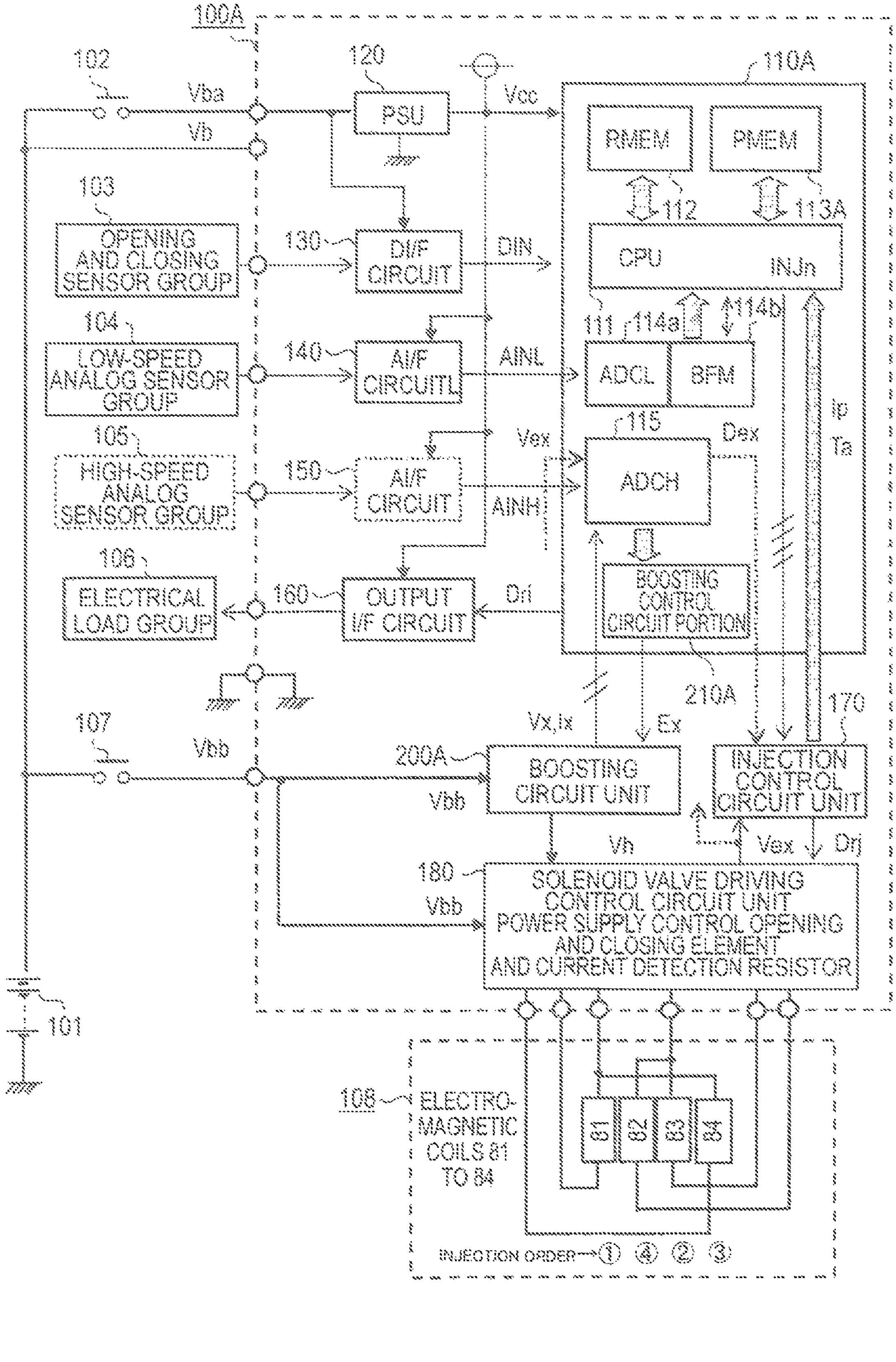
FIG. 1 is an entire circuit block diagram of an in-vehicle engine control device according to Embodiment 1 of this invention.

Hereinafter, a description will be made of FIG. 1 which is an entire circuit block diagram of a device according to Embodiment 1 of this invention. In FIG. 1, an in-vehicle engine control device 100A includes an arithmetic and control circuit unit 110A which is formed as an integrated circuit element of one chip or two chips along with a boosting control circuit portion 210A or an injection control circuit unit 170 described later, a solenoid valve driving control circuit unit 180 for electromagnetic coils 81 to 84 described later provided in an fuel injection solenoid valve 108, and a boosting circuit unit 200A which is a high voltage source for rapidly exciting the electromagnetic coils 81 to 84. First, an in-vehicle battery 101 which is connected to outside of the in-vehicle engine control device 100A directly supplies a battery voltage Vb to the in-vehicle engine control device 100A and supplies a main power supply voltage Vba to the in-vehicle engine control device 100A via a control power supply switch 102. The control power supply switch 102 is an output contact point of a main power supply relay which is closed when a power supply switch (not shown) is closed, and is opened with a predetermined delay time when the power supply switch is opened. While the control power supply switch 102 is being opened, a storage state of a RAM 112 described later is maintained using the battery voltage Vb which is directly supplied from the in-vehicle battery 101.

The in-vehicle battery 101 supplies a load driving voltage Vbb to the in-vehicle engine control device 100A via a load power supply switch 107, and the load power supply switch 107 is an output contact point of a load power supply relay which is biased by a command from a microprocessor 111. An opening and closing sensor group 103 includes, for example, opening and closing sensors such as a rotation sensor detecting engine rotating speed, a crank angle sensor determining fuel injection timing, and a vehicle speed sensor detecting vehicle speed, and manual operation switches such as an accelerator pedal switch, a brake pedal switch, a hand brake switch, and a shift switch detecting a position of a shift lever of a transmission. A low-speed analog sensor group 104 includes analog sensors performing driving control of the engine, such as an accelerator position sensor detecting an extent of depression of an accelerator pedal, a throttle position sensor detecting an extent of valve opening of an intake throttle, an air flow sensor detecting an intake quantity of the engine, a fuel pressure sensor of a fuel to be injected, an exhaust gas sensor detecting oxygen concentration of an exhaust gas, and a cooling water temperature sensor of the engine (case of a water-cooled engine). These analog sensors are analog sensors with a low rate of change of which a rate of change is relatively smooth.

An analog sensor group 105 is, for example, knocking sensors detecting compression and explosion vibrations of the engine, and the knocking sensors are used as sensors adjusting ignition timing in a case where an in-vehicle engine is a gasoline engine. An electrical load group 106 which is driven by the in-vehicle engine control device 100A is formed by, for example, electrical loads including main machines such as an ignition coils (case of a gasoline engine) and motors for intake valve opening control, and supplementary machines such as a heater for the exhaust gas sensor, a power supply relay for supplying power to a load, an electromagnetic clutch for driving an air conditioner, and warning and display devices. In addition, the electromagnetic coils 81 to 84 which are specific electrical loads in the electrical load group are used to drive the fuel injection solenoid valve 108, and the plurality of electromagnetic coils 81 to 84 are sequentially connected in an opening and closing manner by selective opening and closing elements described later, provided in the respective cylinders, and performs fuel injection into the respective cylinders of the multi-cylinder engine.

In addition, in a case of an in-line four-cylinder engine, in the electromagnetic coils 81 to 84 which are provided so as to correspond to the order of the arranged cylinders 1 to 4, the electromagnetic coils 81 and 84 for the cylinders 1 and 4 disposed outside forma first group, and the electromagnetic coils 83 and 82 for the cylinders 3 and 2 disposed inside form a second group. A fuel is injected so as to be circulated in order of, for example, the electromagnetic coil 81, the electromagnetic coil 83, the electromagnetic coil 84, and the electromagnetic coil 82, and the electromagnetic coil 81, and the electromagnetic coils 81 and 84 of the first group and the electromagnetic coils 83 and 82 alternately inject a fuel so as to reduce a vehicle vibration. Also in a case of an in-line six-cylinder engine or an in-line eight-cylinder engine, electromagnetic coils of the divided first and second groups alternately perform fuel injection, and thereby vehicle vibration is reduced and valve opening command signals for the electromagnetic coils of the same group do not overlap each other in time.

Next, as an internal constituent element of the in-vehicle engine control device 100A, the arithmetic and control circuit unit 110A includes the microprocessor 111, the RAM 112 for an arithmetic process, a nonvolatile program memory 113A which is, for example, a flash memory, a low-speed operation multi-channel A/D converter 114*a* which is of, for example, a sequential conversion type and converts a 16-channel analog input signal into a digital signal, a buffer memory 114*b* which stores digital data converted by the multi-channel A/D converter 114*a* and is connected to the microprocessor 111 via a bus, a high-speed A/D converter 115 which is of, for example, a delta sigma type and converts a 6-channel analog input signal into a digital signal, and the boosting control circuit portion 210A described later which stores digital data converted by the high-speed A/D converter 115 and is connected to the microprocessor 111. In addition, data of the program memory 113A can be electrically collectively erased in the unit of a block, and some blocks are used as a nonvolatile data memory and store and reserve important data of the RAM 112.

A constant voltage source 120 is supplied with a voltage from the in-vehicle battery 101 via the control power supply switch 102, generates a control power supply voltage Vcc of, for example, DC 5 V which is supplied to the arithmetic and control circuit unit 110A, and is also directly supplied with a voltage from the in-vehicle battery 101 so as to generate a backup voltage of, for example, DC 2.8 V for storing and holding data of the RAM 112. An opening and closing input interface circuit 130 is connected between the opening and closing sensor group 103 and a digital input port DIN of the arithmetic and control circuit unit 110A, and performs conversion of a voltage level or a noise suppression process. In addition, the opening and closing input interface circuit 130 is supplied with the main power supply voltage Vba so as to be operated. A low-speed analog input interface circuit 140 is connected between the low-speed analog sensor group 104 and an analog input port AINL of the arithmetic and control circuit unit 110A and performs conversion of a voltage level or a noise suppression process. Further, the low-speed analog input interface circuit 140 is operated using the control power supply voltage Vcc as a power source.

A high-speed analog input interface circuit 150 is connected between the analog sensor group 105 and an analog input portion AINH of the arithmetic and control circuit unit 110A, and performs conversion of a voltage level or a noise suppression process. In addition, the high-speed analog input interface circuit 150 is operated using the control power supply voltage Vcc as a power source. Further, in a case where the analog sensor group 105 with a high rate of change is not used, the high-speed analog input interface circuit 150 is not necessary, but the high-speed A/D converter 115 plays an important role as described later. An output interface circuit 160 includes a plurality of power transistors which drive the electrical load group 106 excluding the electromagnetic coils 81 to 84 which are specific electrical loads, in response to a load driving command signal Dri generated by the arithmetic and control circuit unit 110A, and the electrical load group 106 is supplied with a voltage from the in-vehicle battery 101 via an output contact point of the load power supply relay (not shown).

The boosting circuit unit 200A, which is supplied with the load driving voltage Vbb from the in-vehicle battery 101 via the load power supply switch 107, generates a boosted high voltage Vh of, for example, DC 72 V, with a configuration described later. The boosted high voltage Vh and the load driving voltage Vbb are applied to the solenoid valve driving control circuit unit 180 described later connected to a plurality of electromagnetic coils 81 to 84. The solenoid valve driving control circuit unit 180 includes an opening and closing element for power supply control which is operated so as to be closed and opened by receiving an opening and closing command signal Drj from the injection control circuit unit 170 and a current detection resistor for the electromagnetic coils 81 to 84, and inputs a current detection signal Vex which is a signal voltage proportional to an excitation current to the injection control circuit unit 170 or the high-speed A/D converter 115. In addition, in a case of a form in which the injection control circuit unit 170 described later uses an analog comparison circuit, the current detection signal Vex is input to the injection control circuit unit 170, and, in a case of a form of using a digital comparison circuit, the current detection signal Vex is digitally converted via the high-speed A/D converter 115 and is then input to the injection control circuit unit 170 as a current detection signal Dex.

Figure 2:
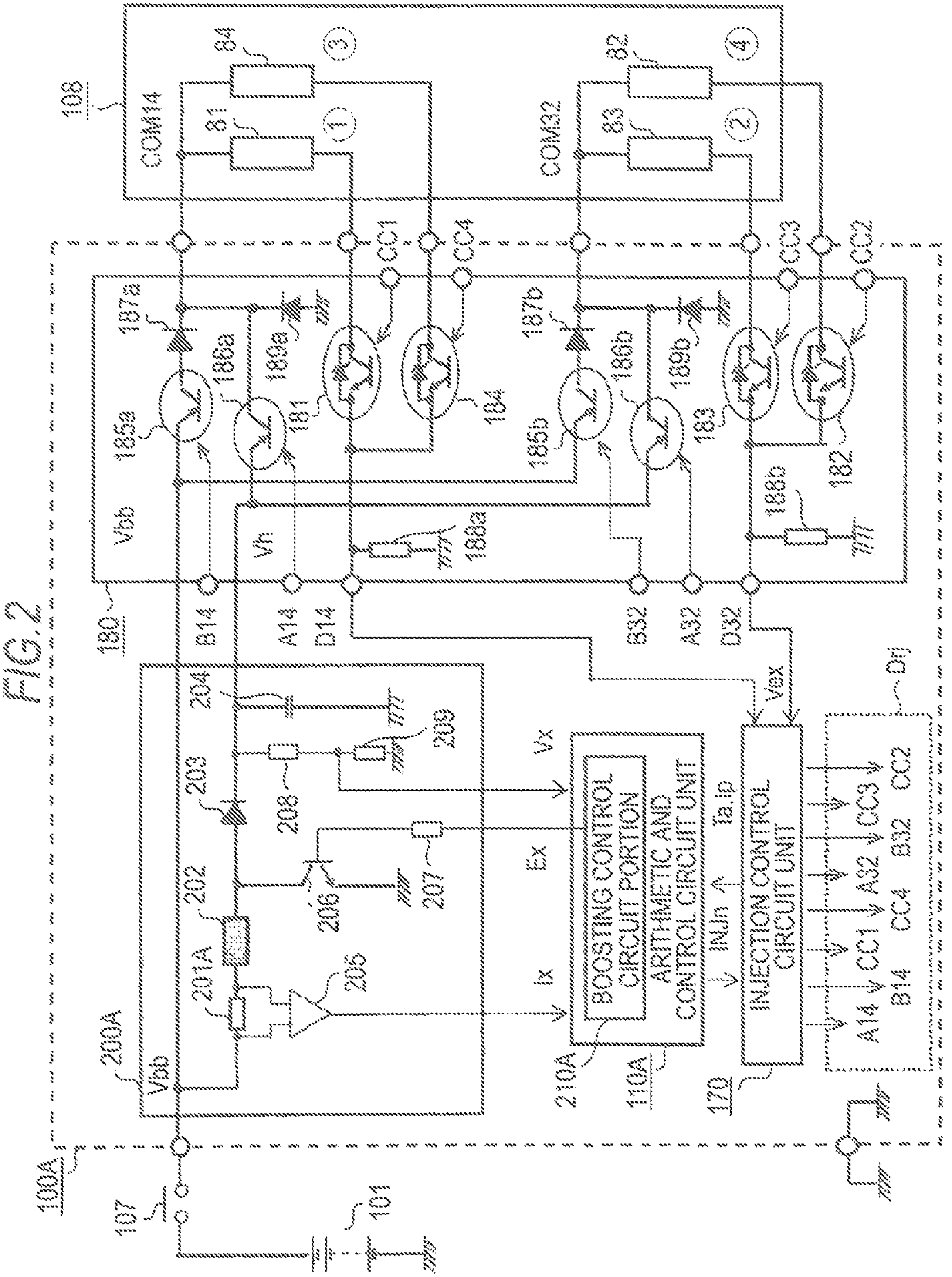
FIG. 2 is a detailed block diagram of some control circuits shown in FIG. 1.

Next, a description will be made of FIG. 2 which is a detailed block diagram of some control circuits shown in FIG. 1. In FIG. 2, the boosting circuit unit 200A is formed by main circuits including a current detection resistor 201A, an inductive element 202, a charging diode 203, and a high-voltage capacitor 204, which are connected in series to each other and to which the load driving voltage Vbb is applied, and a boosting opening and closing element 206 connected between the inductive element 202 and a ground circuit. If a current flowing through the inductive element 202 when the boosting opening and closing element 206 is closed becomes a predetermined value or more, the boosting opening and closing element 206 is opened, and thus electromagnetic energy stored in the inductive element 202 is released to the high-voltage capacitor 204 via the charging diode 203. The boosted high voltage Vh which is a charged voltage of the high-voltage capacitor 204 is increased to a targeted predetermined voltage by intermittently driving the boosting opening and closing element 206 multiple times.

In addition, the current detection resistor 201A is connected to a position through which both of currents flow, including a driving current when the boosting opening and closing element 206 is closed and thus the inductive element 202 is biased so as to be supplied with power, and a current charging the capacitor when the boosting opening and closing element 206 is opened and thus electromagnetic energy is released from the inductive element 202 to the high-voltage capacitor 204. A voltage across both ends of the current detection resistor 201A is amplified by a differential amplifier 205 and is input to the high-speed A/D converter 115 as an inductive element current Ix. In addition, a voltage across both ends of the high-voltage capacitor 204 is divided by dividing resistors 208 and 209 and is input to another input channel of the high-speed A/D converter 115 as a boosted detection voltage Vx. The boosting control circuit portion 210A described later generates a boosting control signal Ex according to values of the inductive element current Ix and the boosted detection voltage Vx which are digitally converted by the high-speed A/D converter 115 so as to open and close the boosting opening and closing element 206 via a driving resistor 207.

The solenoid valve driving control circuit unit 180 includes a series circuit of a first low voltage opening and closing element 185*a* for applying the load driving voltage Vbb to a common terminal COM14 of the electromagnetic coils 81 and 84 of the first group and a first backflow prevention diode 187*a*, a first high voltage opening and closing element 186*a* for applying the boosted high voltage Vh, selective opening and closing elements 181 and 184 which are respectively provided on the downstream side of the electromagnetic coils 81 and 84, a first current detection resistor 188*a* which is provided in common on the downstream side of the selective opening and closing elements 181 and 184, and a free wheel diode 189*a* which is connected in parallel to the series circuit of the electromagnetic coils 81 and 84 of the first group, the selective opening and closing elements 181 and 184, and the first current detection resistor 188*a*. In addition, similarly, the electromagnetic coils 83 and 82 of the second group are connected to a second low voltage opening and closing element 185*b*, a second backflow prevention diode 187*b*, a second high voltage opening and closing element 186*b*, selective opening and closing elements 182 and 183, a second current detection resistor 188*b*, and a second free wheel diode 189*b*. Further, the selective opening and closing elements 181 to 184 include a voltage limiting function for absorbing a surge voltage which occurs when excitation currents of the electromagnetic coils 81 to 84 are blocked.

The injection control circuit unit 170 which cooperates with the arithmetic and control circuit unit 110A generates a first high voltage opening and closing command signal A14 as the opening and closing command signal Drj so as to close the first high voltage opening and closing element 186*a*, generates a first low voltage opening and closing command signal B14 so as to close the first low voltage opening and closing element 185*a*, and generates selective opening and closing command signals CC1 and CC4 so as to close the selective opening and closing elements 181 and 184. Similarly, the injection control circuit unit 170 generates a second high voltage opening and closing command signal A32 so as to close the second high voltage opening and closing element 186*b*, generates a second low voltage opening and closing command signal B32 so as to close the second low voltage opening and closing element 185*b*, and generates selective opening and closing command signals CC3 and CC2 so as to close the selective opening and closing elements 183 and 182. In addition, an input filter circuit and first and second differential amplifiers (none is shown) generate a two-channel current detection signal voltage Vex by using current detection signals D14 and D32 which are respective voltages across both ends of the first and second current detection resistors 188*a* and 188*b*, so as to be input to the injection control circuit unit 170 or the high-speed A/D converter 115.

Figure 3:
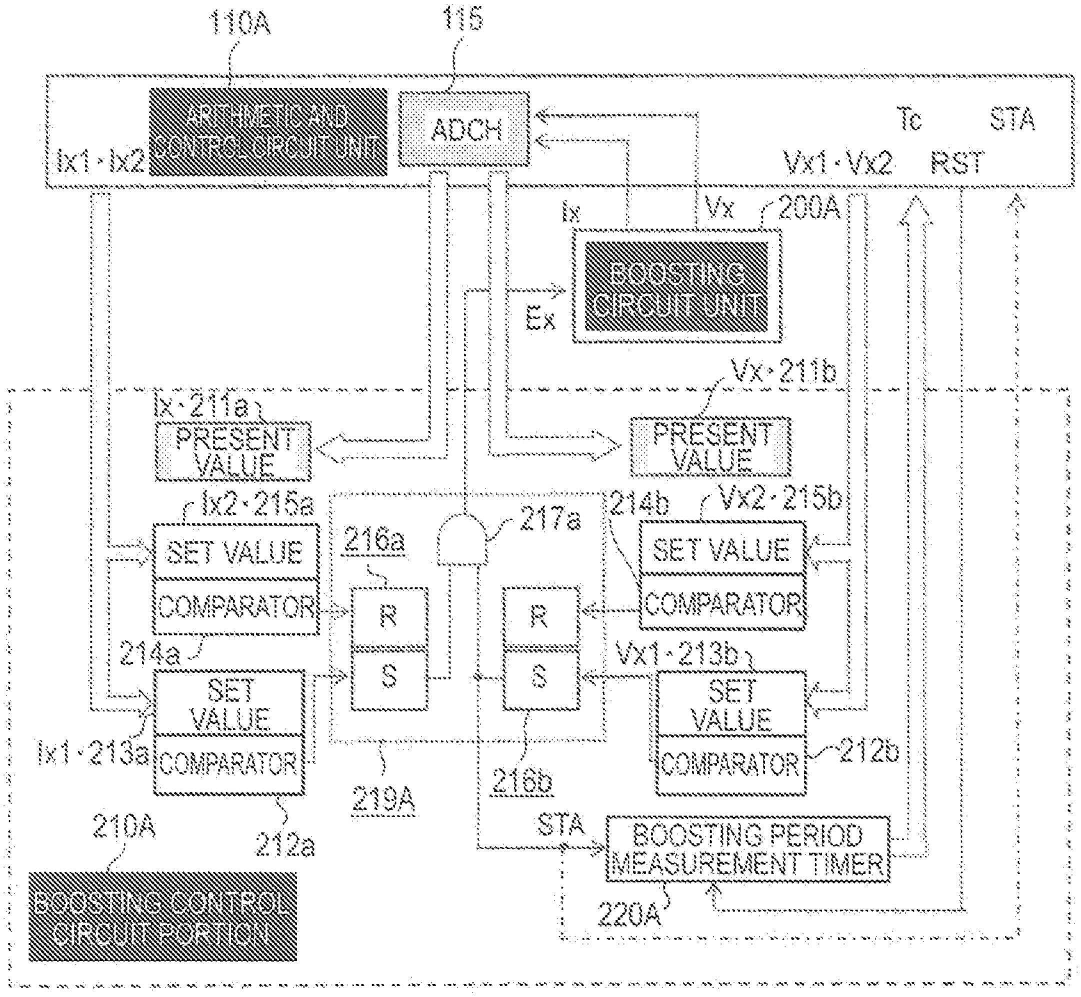
FIG. 3 is a detailed block diagram of the boosting control circuit portion shown in FIG. 1.

Next, a description will be made of FIG. 3 which is a detailed block diagram of the boosting control circuit portion shown in FIG. 1. In FIG. 3, the boosting control circuit portion 210A includes a current present value register 211*a* which stores a present value of the inductive element current Ix which is digitally converted by the high-speed A/D converter 115, a voltage present value register 211*b* which stores a present value of the boosted detection voltage Vx, a lower-side current set register 213*a* in which a target lower-side current Ix1 is set by the microprocessor 111, a higher-side current set register 215*a* in which a target higher-side current Ix2 is set, a lower-side current comparator 212*a* which compares a numerical value stored in the lower-side current set register 213*a* with a present value of the current present value register 211*a*, and a higher-side current comparator 214*a* which compares a numerical value stored in the higher-side current set register 215*a* with a present value of the current present value register 211*a*. Further, the boosting control circuit portion 210A includes a lower-side voltage set register 213*b* in which a target lower-side voltage Vx1 is set by the microprocessor 111, a higher-side voltage set register 215*b* in which a target higher-side voltage Vx2 is set, a lower-side voltage comparator 212*b* which compares a numerical value stored in the lower-side voltage set register 213*b* with a present value of the voltage present value register 211*b*, and a higher-side voltage comparator 214*b* which compares a numerical value stored in the higher-side voltage set register 215*b* with a present value of the voltage present value register 211*b*.

A first flip-flop circuit 216*a* is set by an output of the lower-side current comparator 212*a* and is reset by an output of the higher-side current comparator 214*a*, and a second flip-flop circuit 216*b* is set by an output of the lower-side voltage comparator 212*b* and is reset by an output of the higher-side voltage comparator 214*b*. A logical product element 217*a* outputs the boosting control signal Ex with a logical level "H" when both of a set output of the first flip-flop circuit 216*a* and a set output of the second flip-flop circuit 216*b* are in a logical level "H", thereby turning on the boosting opening and closing element 206 via the driving resistor 207 of FIG. 2. Therefore, if a value of the boosted detection voltage Vx temporarily becomes equal to or more than the target higher-side voltage Vx2, a set output of the second flip-flop circuit 216*b* is in a logical level "L" until the value becomes equal to or lower than the target lower-side voltage Vx1, and this inhibits generation of the boosting control signal Ex. If the value of the boosted detection voltage Vx temporarily becomes equal to or lower than the target lower-side voltage Vx1, a set output of the second flip-flop circuit 216*b* is in a logical level "H" until the value becomes equal to or more than the target higher-side voltage Vx2, and this allows the boosting control signal Ex to be generated.

On the other hand, if the value of the inductive element current Ix is equal to or smaller than the target lower-side current Ix1, an output of the first flip-flop circuit 216*a* is in a logical level "H" until the value becomes equal to or more than the target higher-side current Ix2, and thus the boosting control signal Ex can be generated. Whether or not a logical level of the boosting control signal Ex actually becomes "H" is determined by a state of the second flip-flop circuit 216*b*. In addition, if the value of the inductive element current Ix becomes equal to or more than the target higher-side current Ix2, an output of the first flip-flop circuit 216*a* is in a logical level "L" until the value becomes equal to or lower than the target lower-side current Ix1, and thus generation of the boosting control signal Ex stops. Further, for example, if a value of ¼ (or ½) of the target higher-side current Ix2 is used instead of the microprocessor 111 directly setting a value of the target lower-side current Ix1 stored in the lower-side current set register 213*a*, the lower-side current set register 213*a* is not necessary. In this case, the lower-side current comparator 212*a* may compare data which is obtained by shifting binary data stored in the higher-side current set register 215*a* downward by two bits (or one bit) with input data of the current present value register 211*a*.

In addition, for example, if a value obtained by subtracting a difference value corresponding to two bits (one bit) from the target higher-side voltage Vx2 is used instead of the microprocessor 111 directly setting a value of the target lower-side voltage Vx1 stored in the lower-side voltage set register 213*b*, the lower-side voltage set register 213*b* is not necessary. In this case, if the lower two bits (or lower one bit) of the higher-side voltage set register 215*b* is set to a logic "1" at all times, the lower-side voltage comparator 212*b* may replace the lower two bits (or lower one bit) of the higher-side voltage set register 215*b* with a logic "0" so as to be compared with input data of the voltage present value register 211*b*. In addition, an appropriate difference value between the target higher-side voltage Vx2 and the target lower-side voltage Vx1 is slight but may be greater than at least a voltage which is boosted once by electromagnetic energy of the inductive element 202. In addition, in a case where a charged voltage of the high-voltage capacitor 204 is reduced to the minimum voltage Vx0 by single rapid excitation for the electromagnetic coils 81 to 84, the target lower-side voltage Vx1 may be equal to or more than the minimum voltage Vx0.

A boosting period measurement timer 220A measures a charging time for the high-voltage capacitor 204 in response to a clocking command signal STA which has a logical level "H" in a period when a logical level of the set output of the second flip-flop circuit 216*b* is "H", and the high-voltage capacitor 204 is being charged by performing opening and closing control on the boosting opening and closing element 206. The boosting period measurement timer 220A is initialized by a reset command signal RST which is obtained through a logical sum of rising differential signals of valve opening command signals INJ81 to INJ84 generated by the microprocessor. In addition, the clocking command signal STA and a present value of the boosting period measurement timer 220A are transmitted to the microprocessor 111, and thus the microprocessor 111 can monitor whether or not charging of the high-voltage capacitor 204 is completed through the clocking command signal STA. However, if the microprocessor 111 reads a charging necessary time Tc which is a present value of the boosting period measurement timer 220A immediately before generating the next valve opening command signals INJ81 to INJ84, the clocking command signal STA is not required to be monitored.

In addition, in a standby period after a charged voltage of the high-voltage capacitor 204 reaches the target higher-side voltage Vx2 until the next rapid excitation is performed, even if the high-voltage capacitor 204 undergoes some voltage drop due to self-discharge caused by leakage resistance inside and outside the high-voltage capacitor 204, the high-voltage capacitor 204 does not start to be charged again until the next rapid excitation if the target lower-side voltage Vx1 is set to be lower than the residual charged voltage at this time. Therefore, if charging is set to immediately start when a charged voltage becomes equal to or lower than the target lower-side voltage Vx1 due to starting of rapid excitation, and thereby the boosting period measurement timer 220A is temporarily initialized right after the charging starts, clocking can substantially start in synchronization with generation of the valve opening command signals INJ81 to INJ84 even if the microprocessor 111 does not use the reset command signal RST.

(2) Detailed Description of Effects and Operations

Figure 5:
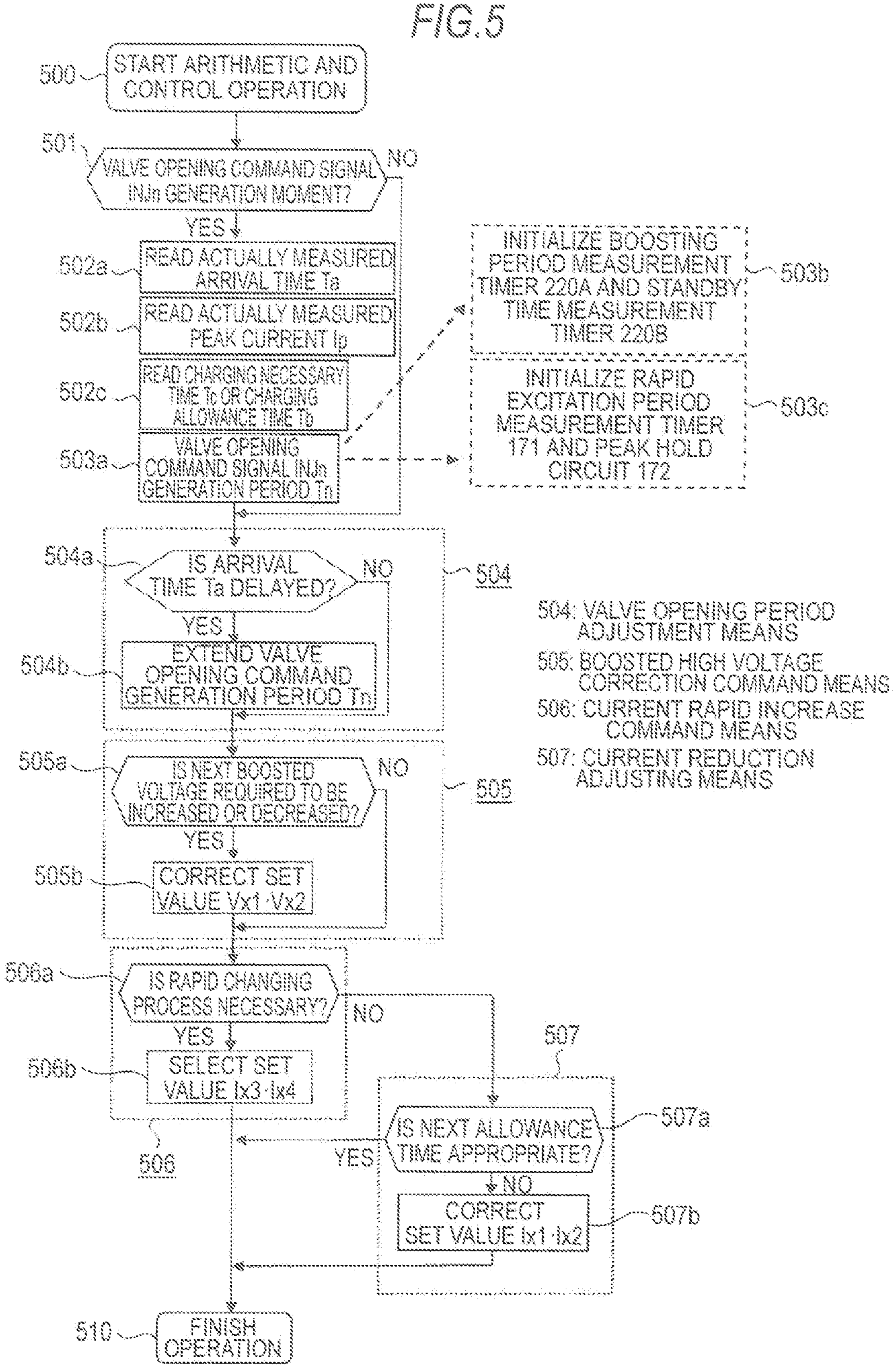
FIG. 5 is a flowchart illustrating an operation of the microprocessor shown in FIG. 1.
Figure 6:
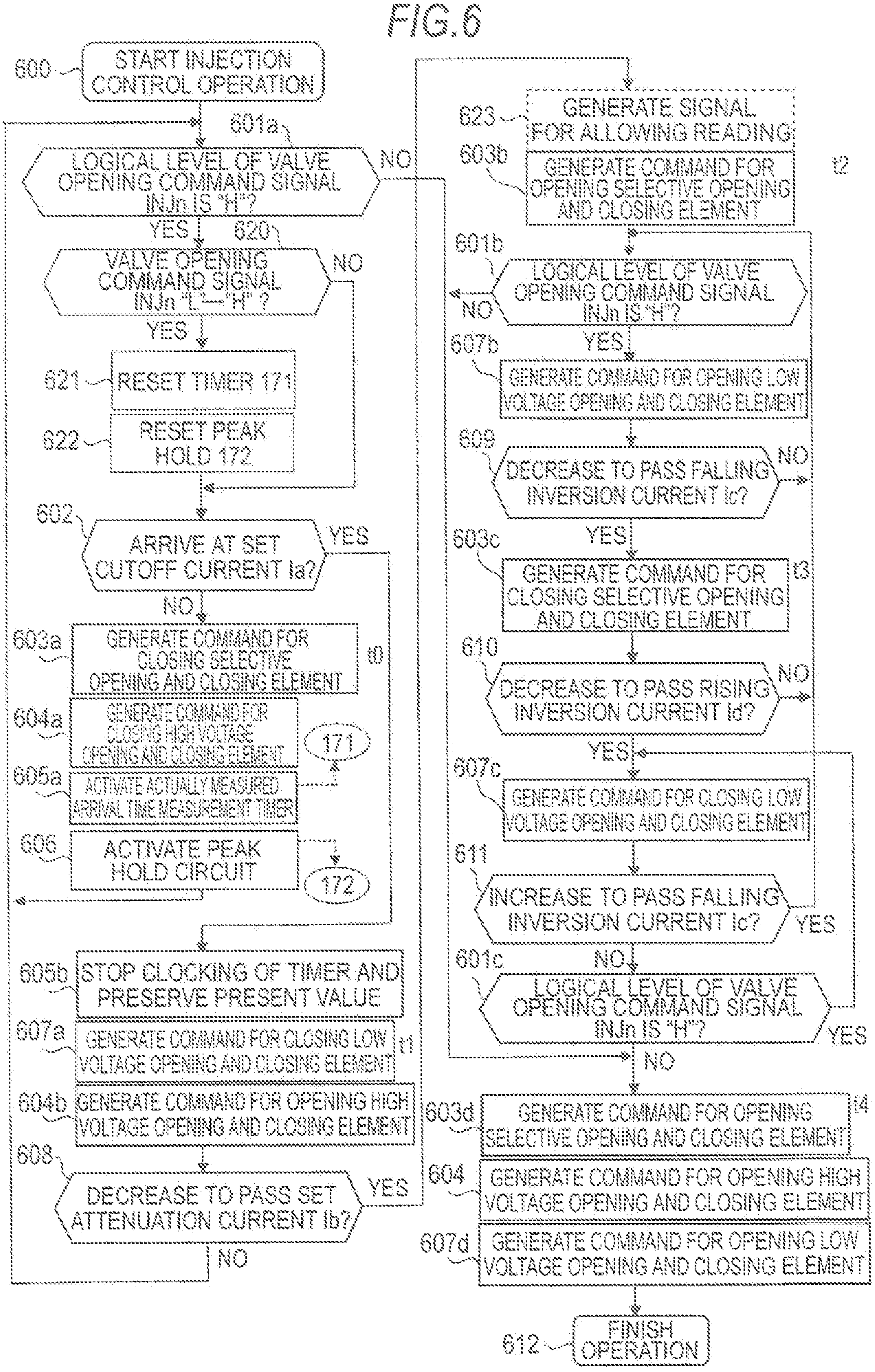
FIG. 6 is a flowchart illustrating an operation of the injection control circuit unit shown in FIG. 1.

Hereinafter, in the device according to Embodiment 1 of this invention configured as in FIG. 1, effects and operations will be described in detail with reference to a time chart of FIG. 4 illustrating operations and flowcharts of FIGS. 5 and 6 illustrating operations. First, in FIG. 1, when a power supply switch (not shown) is closed, the control power supply switch 102 which is an output contact point of the main power supply relay is closed, and thus the main power supply voltage Vba is applied to the in-vehicle engine control device 100A. As a result, the constant voltage source 120 generates the control power supply voltage Vcc of, for example, DC 5 V, and the microprocessor 111 starts a control operation. The microprocessor 111 closes the load power supply switch 107 by biasing the load power supply relay according to operation states of the opening and closing sensor group 103, the low-speed analog sensor group 104, and the analog sensor group 105 with a high rate of change, and content of a control program stored in the nonvolatile program memory 113A. In addition, the microprocessor 111 generates the load driving command signal Dri for the electrical load group 106, and generates the opening and closing command signal Drj via the injection control circuit unit 170 for the electromagnetic coils 81 to 84 which are specific electrical loads of the electrical load group 106. On the other hand, the boosting circuit unit 200A charges the high-voltage capacitor 204 to a high voltage through an intermittent operation of the boosting opening and closing element 206 shown in FIG. 2.

Next, a description will be made of FIG. 4 which is a time chart illustrating an operation of the in-vehicle engine control device shown in FIG. 1. (A) of FIG. 4 shows a logical waveform of the valve opening command signals INJn (where n is 81 to 84) which are sequentially generated by the microprocessor 111. This waveform is turned to a logical level “H” at the time point t0 before the top dead center of a cylinder which is a fuel injection target so as to generate a valve opening command, and is turned to a logical level “L” at the time point t4 when a valve opening command generation period Tn has elapsed so as to cancel the valve opening command. The next valve opening command signals INJn are generated when a fuel injection interval Ts corresponding to a reciprocal of the engine speed has elapsed. In addition, the valve opening command generation period Tn is a value which is proportional to an intake quantity (gr/sec) of an intake pipe detected by the air flow sensor and is inversely proportional to engine speed (rps) and an average flow rate (gr/sec) of a fuel supplied when a valve is opened, and the larger the fuel pressure of a supplied fuel, the greater the average flow rate. (B) of FIG. 4 shows a logical waveform of the high voltage opening and closing command signals A14 and A32, and, for example, when the valve opening command signal INJ81 or INJ84 is generated, the high voltage opening and closing command signal A14 is turned to a logical level “H” in a period from the time point t0 to the time point t1 described later, and thereby the first high voltage opening and closing element 186*a* is closed. In addition, in a case where the valve opening command signals INJ83 and INJ82 are generated, the high voltage opening and closing command signal A32 is turned to a logical level “H”, and thereby the second high voltage opening and closing element 186*b* is closed.

(C) of FIG. 4 shows a logical waveform of the low voltage opening and closing command signals B14 and B32, and, for example, when the valve opening command signal INJ81 or INJ84 is generated, a logical level of the first low voltage opening and closing command signal B14 is alternately turned to “H” and “L” in a period from the time point t3 to the time point t4 described later, and thereby the first low voltage opening and closing element 185*a* performs an opening and closing operation. In addition, in a case where the valve opening command signal INJ82 or INJ82 is generated, a logical level of the second low voltage opening and closing command signal B32 is alternately turned to “H” and “L”, and thereby the second low voltage opening and closing element 185*b* performs an opening and closing operation. Further, in an abnormal situation in which the boosted high voltage Vh cannot be obtained due to an abnormal operation of the boosting circuit unit 200A, the low voltage opening and closing command signals B14 and B32 are generated as indicated by the dot line 401, a valve opening operation is performed using the first or second low voltage opening and closing element 185*a* or 185*b*, and the valve opening command generation period Tn is extended to an extent in which the valve opening necessary time is increased. When the boosting circuit unit 200A is normally operated, the low voltage opening and closing elements 185*a* and 185*b* may be closed in the period of the dot line 401.

(D) of FIG. 4 shows a logical waveform of the selective opening and closing command signals CC1 to CC4, and when any one of the valve opening command signals INJ81 to INJ84 is generated, any one of the selective opening and closing command signals CC1 to CC4 is turned to a logical level “H”, and thereby any one of the selective opening and closing elements 181 to 184 is closed. In addition, at the time points t2 to t3 described later, as indicated by the dotted waveform 402, logical levels of the selective opening and closing command signals CC1 to CC4 are set to “L”, and thereby it is possible to rapidly attenuate an excitation current. (E) of FIG. 4 shows a waveform of a surge voltage generated when excitation currents of the electromagnetic coils 81 to 84 are blocked by the selective opening and closing elements 181 to 184, and the magnitude of the surge voltage is limited by the voltage limiting diodes of the selective opening and closing elements 181 to 184. In addition, the dotted waveform 403 is a surge voltage waveform corresponding to the dotted waveform 402, and the solid waveform 404 is a surge voltage waveform generated when the valve opening command signal INJn is canceled at time point t4.

(F) of FIG. 4 shows a waveform of an excitation current Iex of any one of the electromagnetic coils 81 to 84, and, for example, when the valve opening command signal INJ81 is generated, and the first high voltage opening and closing element 186*a* and the selective opening and closing element 181 are closed as described with reference to (B) and (D) of FIG. 4, the electromagnetic coil 81 is rapidly excited using the boosted high voltage Vh. Therefore, the excitation current Iex rapidly increases and thus reaches a set cutoff current Ia at the time point t1. At this time, a logical level of the first high voltage opening and closing command signal A14 is turned to "L", and thereby driving of the first high voltage opening and closing element 186*a* stops. However, a transistor which is an opening and closing element has an opening response delay time, and, particularly, in a case where a high voltage opening and closing element is a field effect transistor, a response delay time is large and also has a characteristic of varying depending on temperature. For this reason, the excitation current Iex continuously rises even if driving of the high voltage opening and closing element stops, and starts to be attenuated after reaching a peak current Ip due to overshoot. In addition, the rising characteristic of the excitation current Iex is influenced by a fluctuation in a resistance due to a temperature variation of the electromagnetic coil. Therefore, in a case where the excitation current rapidly rises, the peak current Ip due to overshoot increases even in the same opening response time.

This overshoot current is monitored and stored as an actually measured peak current Ip by a peak hold circuit 172 described later provided in the injection control circuit unit 170. The microprocessor 111 reads the monitored and stored value and adjusts a value of the boosted high voltage Vh by using boosted high voltage correction command means 505 described later in FIG. 5, and performs control such that the actually measured peak current Ip becomes a predetermined target limitation peak current Ip0. The high voltage opening and closing element is opened, and thereby the excitation current Iex flows back to the first or second free wheel diode 189*a* or 189*b* and is reduced, and finally becomes equal to or less than a set attenuation current Ib. At this time, the selective opening and closing element is opened at the time points t2 to t3 as indicated by the dotted line 402, and the excitation current Iex is rapidly attenuated. A period between the time points t3 and t4 is a valve opening holding control period. When the excitation current falls to a set rising inversion holding current Id or less, the first or second low voltage opening and closing element 185*a* or 185*b* is closed, and thus the excitation current inversely rises. In addition, when the excitation current rises to a set falling inversion holding current Ic or more, the first or second low voltage opening and closing element 185*a* or 185*b* is opened, and thus the excitation current inversely falls. An intermediate average current between the set falling inversion holding current Ic and the set rising inversion holding current Id is a valve opening holding current Ih.

(G) of FIG. 4 shows a clocking period zone of an actually measured arrival time Ta which is measured by a rapid excitation period measurement timer 171 described later provided in the injection control circuit unit 170. The actually measured arrival time Ta is time after a high voltage starts to be supplied to any one of the electromagnetic coils 81 to 84 until the excitation current Iex arrives at the set cutoff current Ia. The microprocessor 111 reads the actually measured arrival time Ta, calculates a deviation with a predetermined target arrival time Ta0, adjusts a value of the boosted high voltage Vh by using the boosted high voltage correction command means 505 described later in FIG. 5, and performs control such that the actually measured arrival time Ta becomes the same as the target arrival time Ta0. In a case where the predetermined target limitation peak current Ip0 or the target arrival time Ta0 cannot be obtained only by adjusting the boosted high voltage Vh, the valve opening command generation period Tn is adjusted using valve opening period adjustment means 504 described later in FIG. 5.

(H) of FIG. 4 shows a variation characteristic of the boosted high voltage Vh which is a charged voltage of the high-voltage capacitor 204. At the time point t0, the high voltage opening and closing command signals A14 and A32 are generated, and the electromagnetic coils 81 to 84 start to be rapidly excited. At this time, the boosted high voltage Vh rapidly decreases from an initial value state close to the target lower-side voltage Vx1, and falls to a value of the minimum voltage Vx0 at the time point t1 when the high voltage opening and closing command signals A14 and A32 are canceled. Thereafter, if charging of the high-voltage capacitor 204 is resumed from the time point t2 with the pause time, the charged voltage rises as indicated by the solid-line characteristic 406, and arrives at the target higher-side voltage Vx2 at the time point t5. However, the rapid excitation starts at the time point t0, and the boosted detection voltage Vx becomes equal to or less than the target lower-side voltage Vx1, and thereby charging of the high-voltage capacitor 204 can be resumed. In this case, the charged voltage changes as indicated by the dot-chain-line characteristic 407, and arrives at the target higher-side voltage Vx2 earlier than the time point t5 by the time t2-t1. In addition, the time from the charging start time point t2 to the charging completion time point t5 is the actual charging necessary time Tc, and the time from the time point t5 to the time point t6 when the next valve opening command signal INJn is generated is the charging allowance time Tb.

However, for convenience, the charging necessary time Tc may use the time measured from the time point t0 to the time point t5, and the boosting period measurement timer 220A shown in FIG. 3 measures the time from the time point t0 to the time point t5. In addition, a value from the minimum value Vbmin to the maximum value Vbmax of the battery voltage shown in (H) of FIG. 4 is smaller than the minimum voltage Vx0 which is the minimum value of the boosted high voltage Vh. The target higher-side voltage Vx2 and the target lower-side voltage Vx1 or the minimum voltage Vx0 does not fluctuate even if the battery voltage fluctuates. However, the charging necessary time Tc considerably fluctuates depending on the magnitude of the battery voltage.

Next, a description will be made of FIG. 5 which is a flowchart illustrating an operation of the in-vehicle engine control device shown in FIG. 1. In FIG. 5, step 500 is a step in which the microprocessor 111 starts a fuel injection control operation. The microprocessor 111 proceeds from the start step to an operation finish step which is step 510 described later, executes other control programs, and repeatedly performs the steps after returning to step 500 again. A repetition cycle thereof is shorter than a fuel injection interval at the maximum engine speed. Subsequent step 501 is a determination step in which the moment of generating the valve opening command signals INJn (where n is 81 to 84) is determined based on a piston position of the engine detected by the crank angle sensor which is one of the opening and closing sensor group 103. YES is determined and then the flow proceeds to step 502*a* if the moment is the generation moment, and NO is determined and then the flow proceeds to step 504*a* if the moment is not the generation moment. In step 502*a*, the actually measured arrival time Ta (refer to (G) of FIG. 4) measured by the rapid excitation period measurement timer 171 described later is read, and, in subsequent step 502*b*, the actually measured peak current Ip (refer to (F) of FIG. 4) measured by the peak hold circuit 172 described later in FIG. 6 is read, and the flow proceeds to step 502*c*.

In step 502*c*, the charging necessary time Tc (or the charging allowance time Tb) of (H) of FIG. 4 measured by the boosting period measurement timer 220A of FIG. 3 (or a standby time measurement timer 220B of FIG. 9) is read, and the flow proceeds to step 503*a*. In step 503*a*, the valve opening command signal INJn is generated in the valve opening command generation period Tn which is temporarily determined based on engine speed detected by the engine speed sensor which is one sensor of the opening and closing sensor group 103 and an intake quantity and fuel pressure detected by the air flow sensor and the fuel pressure sensor which are sensors of the low-speed analog sensor group 104, and the flow proceeds to step 504*a*. In addition, the boosting control circuit portion 210A (or a boosting control circuit portion 210B) shown in FIG. 3 (or FIG. 9) initializes the boosting period measurement timer 220A (or the standby time measurement timer 220B) in response to the valve opening command signal INJn generated in step 503*a*, and this is indicated in step 503*b*. Further, the injection control circuit unit 170 initializes the rapid excitation period measurement timer 171 and the peak hold circuit 172 in step 621 and step 622 of FIG. 6 described later in response to the valve opening command signal INJn generated in step 503*a*, and this is indicated in step 503*c*.

Step 504*a* is a determination step in which it is determined whether or not the actually measured arrival time Ta read in step 503*a* is later than the predetermined target arrival time Ta0, and YES is determined and then the flow proceeds to step 504*b* if the time Ta is later than the time Ta0, and NO is determined and then the flow proceeds to step 505*a* if the time Ta is not later than the time Ta0. In step 504*b*, finish timing of the valve opening command signal INJn generated in step 503*a* is corrected to be extended, and the flow proceeds to step 505*a*. The step block 504 formed by step 504*a* and step 504*b* is valve opening period adjustment means. Step 505*a* is a step in which it is determined whether or not the next boosted high voltage Vh is corrected so as to increase or decrease according to deviations between values of the actually measured arrival time Ta and the actually measured peak current Ip read in steps 502*a* and 502*b* and the predetermined target arrival time Ta0 and the target limitation peak current Ip0. YES is determined and then the flow proceeds to step 505*b* if an increase or decrease is necessary, and NO is determined and then the flow proceeds to step 506*a* if an increase or decrease is not necessary. In step 505*b*, values of the target higher-side voltage Vx2 and the target lower-side voltage Vx1 stored in the higher-side voltage set register 215*b* and the lower-side voltage set register 213*b* of FIG. 3 are corrected, and then the flow proceeds to step 506*a*. The step block 505 formed by step 505*a* and step 505*b* is boosted high voltage correction command means.

Step 506*a* is a determination step in which it is determined whether or not a driving current for the inductive element 202 of FIG. 2 is rapidly increased. For example, in a case where the gear shift sensor which is one of the opening and closing sensor group 103 detects shift to a low stage, or the accelerator position sensor which is one of the low-speed analog sensor group 104 detects sudden depression, in a case where following injection is performed immediately after preceding injection is performed in a divided injection mode, or the like, YES is determined, and if YES is determined, the flow proceeds to step 506*b*, and if NO is determined, the flow proceeds to step 507*a*. In step 506*b*, a value of a rated higher-side current Ix3 or an increase higher-side current Ix4 is selected and is set as a value of the target higher-side current Ix2 stored in the higher-side voltage set register 215*a* of FIG. 3, and the flow proceeds to operation finish step 510. In addition, the rated higher-side current Ix3 is a predetermined set current which is aimed at charging of the high-voltage capacitor 204 being completed until the next rapid excitation moment even in a case where a voltage of the in-vehicle battery 101 is low and engine speed is high. Further, the increase higher-side current Ix4 is applied when divided following injection is performed, and is a short-time rated set current which is greater than the rated higher-side current Ix3. The step block 506 formed by step 506*a* and step 506*b* is current rapid increase command means.

Step 507*a* is a determination step in which, if a difference value ΔT=Tn−Tc between the previous charging necessary time Tc read in step 502*c* (measured as the time after the previous valve opening command signal INJn is generated until charging of the high-voltage capacitor 204 is completed) and the valve opening command generation period Tn which is scheduled by the next valve opening command signal INJn is within a predetermined time range, appropriate YES is determined, and then the flow proceeds to operation finish step 510, but if the difference value ΔT is too large or too small, NO is determined, and then the flow proceeds to step 507*b*. In addition, in step 502*c*, if the previous charging allowance time Tb is read within the previous valve opening command generation period Tn, the previous charging necessary time is Tc=Tn−Tb.

Therefore, the present charging allowance time Tb' in the valve opening command generation period Tn' which is scheduled this time is calculated as Tb'=Tn'−Tc=Tb+(Tn'−Tn).

Step 507*b* is a step in which values of the target higher-side current Ix2 and the target lower-side current Ix1 stored in the higher-side current set register 215*a* and the lower-side current set register 213*a* of FIG. 3 are corrected so as to be increased or decreased, and the flow proceeds to operation finish step 510. The target lower-side current Ix1 is set to, for example, a value of ¼ of the target higher-side current Ix2 in tandem therewith. If the charging allowance time Tb is too small, the target higher-side current Ix2 is increased, and if the charging allowance time Tb is too large, the target higher-side current Ix2 is decreased. Thus, the step block 507 formed by steps 507*a* and 507*b* is current reduction adjusting means. Therefore, according to the current rapid increase command means 506 and the current reduction adjusting means 507, when the engine is suddenly accelerated, a driving current of the inductive element 202 is forced to be set to the rated higher-side current Ix3 through step 506*b*, and, finally, if transfer to cruising driving of a normal vehicle speed is performed, the driving current is gradually reduced through step 507*b*, and intermittent driving is performed based on a suppression target higher-side current Ix20 which is a learning value suitable for the engine speed, the battery voltage, or the temperature condition of the inductive element. As a result, a temperature increase of the boosting circuit unit 200A is suppressed, and an allowance of performing short-time rated divided injection using the increase higher-side current Ix4 occurs. In addition, according to the valve opening period adjustment means 504 and the boosted high voltage correction command means 505, the actually measured arrival time Ta or the actually measured peak current Ip is monitored, and the valve opening command generation period Tn and the target boosted voltage are corrected so as to correspond to a fluctuation in the rapid excitation characteristic.

Next, a description will be made of FIG. 6 which is a flowchart illustrating an operation of the injection control circuit unit shown in FIG. 1. In addition, the injection control circuit unit 170 is constituted by a logical circuit in which a microprocessor is not embedded, and the flowchart described here equivalently illustrates an operation of the logical circuit. A description will be made of a case where the current detection signal Vex generated by the solenoid valve driving control circuit unit 180 of FIG. 2 is input to the injection control circuit unit 170 as an analog signal. Step 600 is a step in which the injection control circuit unit 170 starts to be operated, a series of steps including step 600 to step 612 is repeatedly performed, and the flow immediately proceeds to operation start step 600 after operation finish step 612. Subsequent step 601*a* is a determination step in which it is determined whether or not the valve opening command signal INJn generated by the microprocessor 111 is in a logical level "H", and YES is determined and then the flow proceeds to step 620 in a logical level "H", and NO is determined and then the flow proceeds to step 603*d* in a logical level "L". Step 620 is a determination step in which it is determined whether or not a time is just after a logical level of the valve opening command signal INJn changes from "L" to "H", and YES is determined and then the flow proceeds to step 621 if the time is just after a logical level of the valve opening command signal INJn changes from "L" to "H", and NO is determined and then the flow proceeds to step 602 if the time is not the just after the change but the next cycle. Step 621 is a step in which a present value of the rapid excitation period measurement timer 171 activated in step 605*a* described later is reset so as to be initialized, and then flow proceeds to step 622. Step 622 is a step in which a present value of the peak hold circuit 172 activated in step 606 described later is reset so as to be initialized, and the flow proceeds to step 602.

Step 602 is a determination step in which it is determined whether or not the excitation current Iex of the electromagnetic coils 81 to 84 detected by the current detection signal Vex has risen to the set cutoff current Ia, and NO is determined and then the flow proceeds to step 603*a* if the current Iex has not risen thereto, and YES is determined and then the flow proceeds to step 605*b* if the current Iex has risen thereto. Step 603*a* is a step in which any one of the selective opening and closing command signals CC1 to CC4 is generated, any one of the selective opening and closing elements 181 to 184 is driven so as to be closed, and then the flow proceeds to step 604*a*. Step 604*a* is a step in which the first or second high voltage opening and closing command signal A14 or A32 is generated, the first or second high voltage opening and closing element 186*a* or 186*b* is driven so as to be closed, and then the flow proceeds to step 605*a*. Step 605*a* is a step in which the rapid excitation period measurement timer 171 provided in the injection control circuit unit 170 is activated so as to start to measure the actually measured arrival time Ta, and then the flow proceeds to step 606. Step 606 is a step in which the peak hold circuit 172 provided in the injection control circuit unit 170 is activated so as to start an operation in which currents larger than previous currents are sequentially stored according to an increase in the excitation current Iex, and the flow returns to step 601*a*. If a logical level of the valve opening command signal INJn is still "H", and the excitation current Iex does not arrives at the set cutoff current Ia, step 601*a* (determination of YES), step 620 (determination of NO), step 602 (determination of NO), and steps 603*a* to 606 are repeatedly performed, and, finally, if the determination in step 602 is YES, the flow escapes from this circulation loop and proceeds to step 605*b*. At this time, the excitation current Iex rises and arrives at the set cutoff current Ia.

Step 605*b* is a step in which the rapid excitation period measurement timer 171 activated in step 605*a* stops the clocking operation, a clocked present value is maintained as it is, and the flow proceeds to step 607*a*. Step 607*a* is a step in which the first or second low voltage opening and closing command signal B14 or B32 is generated, and the first or second low voltage switching element 185*a* or 185*b* is driven so as to be closed, and then the flow proceeds to step 604*b*. Step 604*b* is a step in which the first or second high voltage opening and closing command signal A14 or A32 generated in step 604*a* stops to be generated, the first or second high voltage opening and closing element 186*a* or 186*b* is commanded to be opened, and then the flow proceeds to step 608. Step 608 is a determination step in which it is determined that the excitation current Iex is reduced to pass a predetermined set attenuation current Ib, and NO is determined and the flow returns to step 601*a* if the current Iex does not pass the current Ib, and YES is determined and then the flow proceeds to step 623 if the current Iex is reduced to pass the current Ib. If a logical level of the valve opening command signal INJn is still "H", and the excitation current Iex is not reduced to pass the set attenuation current Ib, step 601*a* (determination of YES), step 620 (determination of NO), step 602 (determination of YES), step 605*b*, step 607*a*, step 604*b*, and step 608 are repeatedly performed, and, finally, if the determination in step 608 is YES, the flow escapes from this circulation loop and proceeds to step 623. At this time, the excitation current Iex is reduced to pass the set attenuation current Ib.

Step 623 is a step in which a signal which allows the actually measured arrival time Ta measured by the rapid excitation period measurement timer 171 and the actually measured peak current Ip measured by the peak hold circuit 172 to be read is generated for the microprocessor 111, and then the flow proceeds to step 603*b*. The microprocessor 111 reads the actually measured arrival time Ta and actually measured peak current Ip via the multi-channel A/D converter 114*a* which is operated at low speed. However, if this data reading is performed right before the next valve opening command signal INJn is generated, step 623 is not necessary. Step 603*b* is a step in which any one of the selective opening and closing command signals CC1 to CC4 generated in step 603*a* stops to be generated, all of the selective opening and closing elements 181 to 184 are opened, and the flow proceeds to step 601*b*. Step 601*b* is a determination step in which it is determined whether or not the valve opening command signal INJn generated by the microprocessor 111 is still in a logical level "H", and YES is determined and then the flow proceeds to step 607*b* in a logical level "H", and NO is determined and then the flow proceeds to step 603*d* in a logical level "L". Step 607*b* is a step in which the first or second low voltage opening and closing command signal B14 or B32 generated in step 607*a* stops to be generated, the first or second low voltage switching element 185*a* or 185*b* is opened, and then the flow proceeds to step 609. Step 609 is a determination step in which it is determined that the excitation current Iex is reduced to pass a predetermined set falling inversion holding current Ic, and NO is determined and the flow returns to step 601*b* if the current Iex does not pass the current Ic, and YES is determined and then the flow proceeds to step 603*c* if the current Iex is reduced to pass the current Ic.

Step 603*c* is a step in which any one of the selective opening and closing command signals CC1 to CC4 is generated, any one of the selective opening and closing elements 181 to 184 is driven so as to be closed, and then the flow proceeds to step 610. Step 610 is a determination step in which it is determined that the excitation current Iex is reduced to pass a predetermined set rising inversion holding current Id, and NO is determined and the flow returns to step 601*b* if the current Iex does not pass the current Id, and YES is determined and then the flow proceeds to step 607*c* if the current Iex is reduced to pass the current Id. Step 607*c* is a step in which the first or second low voltage opening and closing command signal B14 or B32 is generated, and the first or second low voltage switching element 185*a* or 185*b* is driven so as to be closed, and then the flow proceeds to step 611. Step 611 is a determination step in which it is determined that the excitation current Iex rises to pass the predetermined set falling inversion holding current Ic, and YES is determined and then the flow returns to step 601*b* if the current Iex passes the current Ic, and NO is determined and the flow returns to step 601*c* if the current Iex does not pass the current Ic. Step 601*c* is a determination step in which it is determined whether or not the valve opening command signal INJn generated by the microprocessor 111 is still in a logical level "H", and YES is determined and then the flow returns to step 607*c* in a logical level "H", and NO is determined and then the flow proceeds to step 603*d* in a logical level "L".

Step 603*d* is a step in which any one of the selective opening and closing command signals CC1 to CC4 generated in step 603*a* or 603*c* stops to be generated, all of the selective opening and closing elements 181 to 184 are opened, and the flow proceeds to step 604*c*. Step 604*c* is a step in which the first or second high voltage opening and closing command signal A14 or A32 generated in step 604*a* stops to be generated, the first or second high voltage opening and closing element 186*a* or 186*b* is commanded to be opened, and then the flow proceeds to step 607*d*. Step 607*d* is a step in which the first or second low voltage opening and closing command signal B14 or B32 generated in step 607*a* or 607*c* stops to be generated, the first or second low voltage switching element 185*a* or 185*b* is opened, and then the flow proceeds to operation finish step 612. When an outline of the entire operation is described in combination with the time chart of FIG. 4 in the flowchart configured in the above-described way, steps 603*a*, 604*a*, 605*a*, 606, 601*a*, 620 and 602 correspond to the rapid excitation period from the time point t0 to the time point t1. In addition, steps 607*a*, 604*b*, 608, 601*a*, 620, 602 and 605*b* correspond to the current attenuation period from the time point t1 to the time point t2. Further, steps 603*b*, 601*b*, 607*b* and 609 correspond to the rapid attenuation period from the time point t2 to the time point t3. Furthermore, steps 603*c*, 610, 607*c*, 611, 601*b*, 607*b*, 609 and 603*c* and steps 607*c*, 611 and 601*c* correspond to the valve opening holding period from the time point t3 to the time point t4. In addition, steps 603*d*, 604*c* and 607*d* correspond to the initialization process period right after the time point t4.

In the above description, the description has been made assuming that the current detection signal Vex generated by the solenoid valve driving control circuit unit 180 of FIG. 2 is input to the injection control circuit unit 170 as an analog signal, the rapid excitation period measurement timer 171 generates an analog signal voltage which gradually increases according to starting of clocking, and the peak hold circuit 172 uses a capacitor which stores the maximum value of a signal which is detected and rectified. However, the current detection signal Vex may be input to the high-speed A/D converter 115, a digitally converted value thereof may be input to the injection control circuit unit 170, and the rapid excitation period measurement timer 171 or the peak hold circuit 172 may use a digital circuit. In this case, the comparison processes in steps 602, 608, 609, 610 and 611 are performed by a digital comparison circuit instead of an analog comparison circuit, and set values such as the set cutoff current Ia, the set attenuation current Ib, the set falling reversion holding current Ic, and the set rising inversion holding current Id are stored in a set register (not shown) transmitted from the microprocessor 111.

(3) Main Points and Features of Embodiment 1

As is clear from the above description, an in-vehicle engine control device according to Embodiment 1 of this invention is an in-vehicle engine control device 100A including an solenoid valve driving control circuit unit 180 for a plurality of electromagnetic coils 81 to 84 for driving solenoid valves in order to sequentially drive the solenoid valves 108 for fuel injection provided in respective cylinders of a multi-cylinder engine; a boosting circuit unit 200A which generates a boosted high voltage Vh for performing rapid excitation on the electromagnetic coils 81 to 84; an arithmetic and control circuit unit 110A which has a microprocessor 111 as a main constituent element; and an injection control circuit unit 170 which performs relay between the microprocessor 111 and the solenoid valve driving control circuit unit 180. The arithmetic and control circuit unit 110A includes a multi-channel A/D converter 114*a* operated at low speed, which cooperates with the microprocessor 111, a high-speed A/D converter 115 with a plurality of channels, and a boosting control circuit portion 210A. The microprocessor 111 determines generation moments of valve opening command signals INJn (where n is 81 to 84) for the electromagnetic coils 81 to 84 and a valve opening command generation period Tn on the basis of signal voltages of at least some of an air flow sensor, an accelerator position sensor, and a fuel pressure sensor included in a low-speed analog sensor group 104, which are input to the multi-channel A/D converter 114*a*, and operations of a crank angle sensor and an engine speed sensor of an opening and closing sensor group 103.

The boosting circuit unit 200A includes an inductive element 202 which is intermittently excited by a boosting opening and closing element 206 from an in-vehicle battery 101; a current detection resistor 201A which is connected in series to the inductive element; and a high-voltage capacitor 204 which is charged by releasing electromagnetic energy stored in the inductive element 202 via a charging diode 203 when an inductive element current Ix proportional to a voltage across both ends of the current detection resistor is input to the arithmetic and control circuit unit 110A, the boosting opening and closing element 206 is controlled so as to be opened and closed in response to a boosting control signal Ex generated by the boosting control circuit portion 210A, and the boosting opening and closing element is opened. A divided voltage of the voltage across both ends of the high-voltage capacitor 204 is input to the arithmetic and control circuit unit 110A as a boosted detection voltage Vx, an analog signal voltage proportional to the inductive element current Ix and the boosted detection voltage Vx is input to the high-speed A/D converter 115, and data which is digitally converted by the high-speed A/D converter is stored in a current present value register 211*a* and a voltage present value register 211*b*.

The boosting control circuit portion 210A includes a higher-side current set register 215*a* and a higher-side voltage set register 215*b* which are transmitted from the microprocessor 111 so as to be set; a higher-side current comparator 214*a* and a higher-side voltage comparator 214*b* which respectively compare the magnitudes of numerical values stored in the set registers and numerical values stored in the current present value register 211*a* and voltage present value register 211*b*; and a logical circuit portion 219A. The logical circuit portion 219A compares a value of a target higher-side current Ix2 stored in the higher-side current set register 215*a* with a value of the inductive element current Ix transmitted from the boosting circuit unit 200A by the higher-side current comparator 214*a*. When the value of the inductive element current Ix is smaller than the value of the target higher-side current Ix2, the logical circuit portion 219A activates the boosting control signal Ex such that the boosting opening and closing element 206 is driven so as to be closed. In addition, the logical circuit portion 219A compares a value of a target higher-side voltage Vx2 stored in the higher-side voltage set register 215*b* with a value of the boosted detection voltage Vx transmitted from the boosting circuit unit 200A by using the higher-side voltage comparator 214*b*. When the value of the boosted detection voltage Vx is smaller than the value of the target higher-side voltage Vx2, the logical circuit portion 219A makes the boosting control signal Ex valid such that the boosting opening and closing element 206 is driven so as to be closed.

Therefore, the arithmetic and control circuit unit 110A is divided into a data processing function of setting numerical values of the target higher-side current Ix2 and the target higher-side voltage Vx2 in the boosting circuit unit 200A by using the microprocessor 111 and converting numerical values of the inductive element current Ix and boosted detection voltage Vx by using the high-speed A/D converter 115, and a digital logic control function of performing negative feedback control so as to obtain a relationship in which a target value as which the numerical value is set is the same as a monitored present value into which the numerical value is converted, by using the boosting control circuit portion 210A.

The current detection resistor 201A of the boosting circuit unit 200A is connected to a position through which charging and discharging currents flow when the boosting opening and closing element 206 is closed and thus the inductive element 202 is excited and stores energy and when the boosting opening and closing element 206 is opened and thus electromagnetic energy is released to the high-voltage capacitor 204. The boosting control circuit portion 210A further includes a lower-side current set register 213*a*; and a lower-side current comparator 212*a* which compares the magnitudes of a numerical value stored in the set register and a numerical value stored in the current present value register 211*a*. The logical circuit portion 219A causes the boosting opening and closing element 206 to be opened when the boosting opening and closing element 206 is closed and thus a value of the inductive element current Ix is equal to or more than a value of the target higher-side current Ix2, and generates again the boosting control signal Ex when a value of the inductive element current Ix falls to pass a value or less of the target lower-side current Ix1 stored in the lower-side current set register 213*a*. The target lower-side current Ix1 stored in the lower-side current set register 213*a* is individually set data which is transmitted from the microprocessor 111, or interlocked set data which is obtained by dividing the set data of the higher-side current set register 215*a* by a predetermined magnification.

As above, in relation to a second aspect of this invention, the boosting control circuit portion includes the lower-side current set register and the lower-side current comparator, causes the boosting opening and closing element to be opened when the inductive element current Ix rises to pass the target higher-side current Ix2, and causes the boosting opening and closing element to be closed when the target lower-side current Ix1 falls to pass the target lower-side current Ix1, thereby controlling the inductive element current Ix between the target lower-side current Ix1 and the target higher-side current Ix2. Therefore, the next excitation is performed without waiting for a current flowing through the inductive element to become zero, and thus there is a feature that the high-voltage capacitor can be charged by intermitting the inductive element current at a high frequency, and boosting control efficiency can be increased by reducing a hysteresis loss of a magnetic material forming the inductive element. In addition, when the target lower-side current Ix1 uses a value of ½ or ¼ of the target higher-side current Ix2, a value of the lower-side current set register equals to a value obtained by removing the lower one bit or the lower two bits of the higher-side current set register, and thus there is a feature that the lower-side current set register can be omitted and the higher-side current set register can be used in common. Further, when the target lower-side current Ix1 uses a value of ½ or ¼ of the target higher-side current Ix2, an amount of electromagnetic energy converted through single discharge to the high-voltage capacitor is 75% or 94% of a case where the target lower-side current Ix1 is set to zero, but, alternately, high-frequency intermittent control can be performed. However, 25% or 6% of unconverted electromagnetic energy is not a loss but remains as some of electromagnetic energy stored the next time.

The boosting control circuit portion 210A further includes a lower-side voltage set register 213*b*; and a lower-side voltage comparator 212*b* which compares the magnitudes of a numerical value stored in the set register and a numerical value stored in the voltage present value register 211*b*. The logical circuit portion 219A invalidates the boosting control signal Ex such that the boosting opening and closing element 206 is opened when the a value of the boosted detection voltage Vx is equal to or more than a value of the target higher-side voltage Vx2. In addition, the logical circuit portion 219A compares a value of the target lower-side voltage Vx1 stored in the lower-side voltage set register 213*b* with a value of the boosted detection voltage Vx transmitted from the boosting circuit unit 200A by using the lower-side voltage comparator 212*b*, and makes the boosting control signal Ex valid such that the boosting opening and closing element 206 is driven so as to be closed when a value of the boosted detection voltage Vx is smaller than a value of the target lower-side voltage Vx1. Individually set data which is a value of the target lower-side voltage Vx1 transmitted from the microprocessor 111 is stored in the lower-side voltage set register 213*b*, or interlocked set data which is a value obtained by subtracting a predetermined difference value from a value of the target higher-side voltage Vx2 stored in the higher-side voltage set register 215*b* is stored therein. The difference value is larger than an increment voltage which is charged in the high-voltage capacitor 204 through single current blocking of the inductive element 202, and is smaller than a discharged voltage Vx2–Vx0 of the capacitor 204 according to single rapid excitation for the electromagnetic coils 81 to 84.

As above, in relation to a fourth aspect of this invention, the boosting control circuit portion includes the lower-side voltage set register and the lower-side voltage comparator, causes the boosting opening and closing element to be opened when the boosted detection voltage Vx rises to pass the target higher-side voltage Vx2, and makes the boosting control signal Ex valid when the boosted detection voltage Vx falls to pass the target lower-side voltage Vx1, thereby controlling the boosting opening and closing element so as to be opened and closed depending on the magnitude of the inductive element current Ix.

Therefore, when the boosted high voltage Vh arrives at the target higher-side voltage Vx2, intermittent excitation of the boosting element immediately stops, and when the boosted high voltage Vh is equal to or less than the target lower-side voltage Vx1, the intermittent excitation of the boosting element starts. Thereby, there is a feature that the boosted high voltage Vh can be controlled to a specific value between Vx1 and Vx2, and when a charged voltage of the high-voltage capacitor is reduced due to discharging to the electromagnetic coils 81 to 84, the intermittent operation of the boosting element can immediately start.

The logical circuit portion 219A includes first and second flip-flop circuits 216*a* and 216*b*; and a logical product element 217*a*. The first flip-flop circuit 216*a* is set when a value of the inductive element current Ix is equal to or less than a predetermined target lower-side current Ix1, and is reset when the value of the inductive element current Ix is equal to or more than the predetermined target higher-side current Ix2. The second flip-flop circuit 216*b* is set when a value of the boosted detection voltage Vx is equal to or less than a value of a predetermined target lower-side voltage Vx1, and is reset when the value of the boosted detection voltage Vx is equal to or more than the predetermined target higher-side voltage Vx2. The logical product element 217*a* makes the boosting control signal Ex valid such that the boosting opening and closing element 206 is driven so as to be closed when both of set outputs of the first and second flip-flop circuits 216*a* and 216*b* are logic "1".

As above, in relation to a fifth aspect of this invention, the boosting control circuit portion includes the first flip-flop circuit which is operated according to the magnitude of the inductive element current Ix and the second flip-flop circuit which is operated according to the magnitude of the boosted detection voltage Vx, and intermittently excites the inductive element by using the boosting opening and closing element until a targeted boosted high voltage Vh is obtained. Therefore, there is a feature that it is possible to secure the time required to release electromagnetic energy of the inductive element to the high-voltage capacitor with the simple logical circuit configuration, and it is possible to prevent the boosting opening and closing element from being opened and closed at random due to a slight fluctuation of the boosted high voltage vehicle in a charging completion state of the high-voltage capacitor.

The solenoid valve driving control circuit unit 180 includes first and second low voltage opening and closing elements 185*a* and 185*b* which connect the electromagnetic coils 81 and 84 of a first group and the electromagnetic coils 83 and 82 of a second group, alternately performing fuel injection, to the in-vehicle battery 101 for each group; first and second high voltage opening and closing element 186*a* and 186*b* which are connected to an output of the boosting circuit unit 200A; opening and closing elements for power supply control which include a plurality of selective opening and closing elements 181 to 184 individually connected to the electromagnetic coils 81 to 84; and first and second current detection resistors 188*a* and 188*b* which are connected in series to the electromagnetic coils 81 and 84 of the first group and the electromagnetic coils 83 and 82 of the second group. The injection control circuit unit 170 generates the valve opening command signal INJn, and opening and closing command signals Drj including first and second high voltage opening and closing command signals A14 and A32 for the first and second high voltage opening and closing elements 186*a* and 186*b*, first and second low voltage opening and closing command signals B14 and B32 for the first and second low voltage opening and closing element 185*a* and 185*b*, and selective opening and closing command signals CC1 to CC4 for the selective opening and closing elements 181 to 184, in response to a current detection signal Vex by the first and second current detection resistors 188*a* and 188*b*. The current detection signal Vex is input to the injection control circuit unit 170 as a current detection signal Dex which is digitally converted by the high-speed A/D converter 115. The multi-channel A/D converter 114*a* is a sequential conversion type A/D converter which is operated at low speed, whereas the high-speed A/D converter 115 is a delta sigma type A/D converter. The arithmetic and control circuit unit 110A is constituted by an integrated circuit element of one chip or two chips including all of the multi-channel A/D converter 114*a*, the high-speed A/D converter 115, the boosting control circuit portion 210A, and the injection control circuit unit 170.

As above, in relation to a sixth aspect of this invention, an analog signal handled by the boosting control circuit portion and the injection control circuit unit is digitally converted by the delta sigma type A/D converter which is operated at high speed. Therefore, the boosting control circuit portion and the injection control circuit unit are digitalized, and are thereby integrated with the arithmetic and control circuit unit including the microprocessor, or form an integrated circuit element capable of easily performing interconnection. Therefore, there is a feature that the low-speed and high-speed A/D converters are used together, and thereby it is possible to suppress costs for digitally converting a plurality of analog signals from increasing and to obtain a small-sized and low-priced in-vehicle engine control device capable of using an integrated circuit element through digitalization.

Embodiment 2

(1) Detailed Description of Configuration

Figure 7:
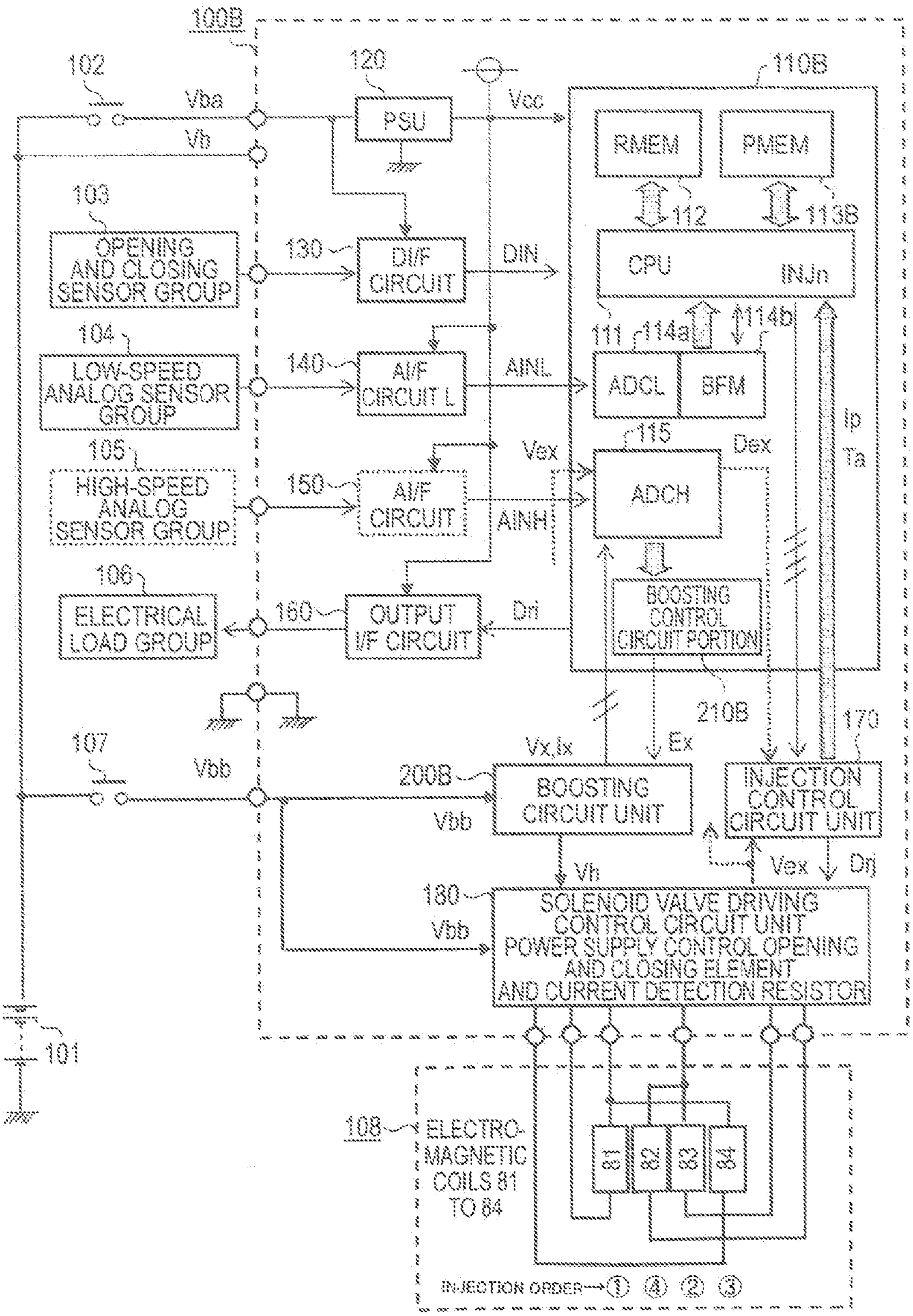
FIG. 7 is an entire circuit block diagram of an in-vehicle engine control device according to Embodiment 2 of this invention.

Hereinafter, a description will be made of FIG. 7 which is an entire circuit block diagram of a device according to Embodiment 2 of this invention, mainly based on differences from those in FIG. 1. In addition, a main difference between the in-vehicle engine control device 100B according to Embodiment 2 and the in-vehicle engine control device 100A according to Embodiment 1 is caused by a difference between a boosting control circuit portion 210B described later in FIGS. 8 and 9 and the boosting control circuit portion 210A, and the other overall configuration is exactly the same in FIGS. 1 and 7. As a result, the arithmetic and control circuit unit 110A and the program memory 113A are replaced with an arithmetic and control circuit unit 110B and a program memory 113B, and the same reference numeral indicates the same or corresponding part in each drawing.

Figure 8:
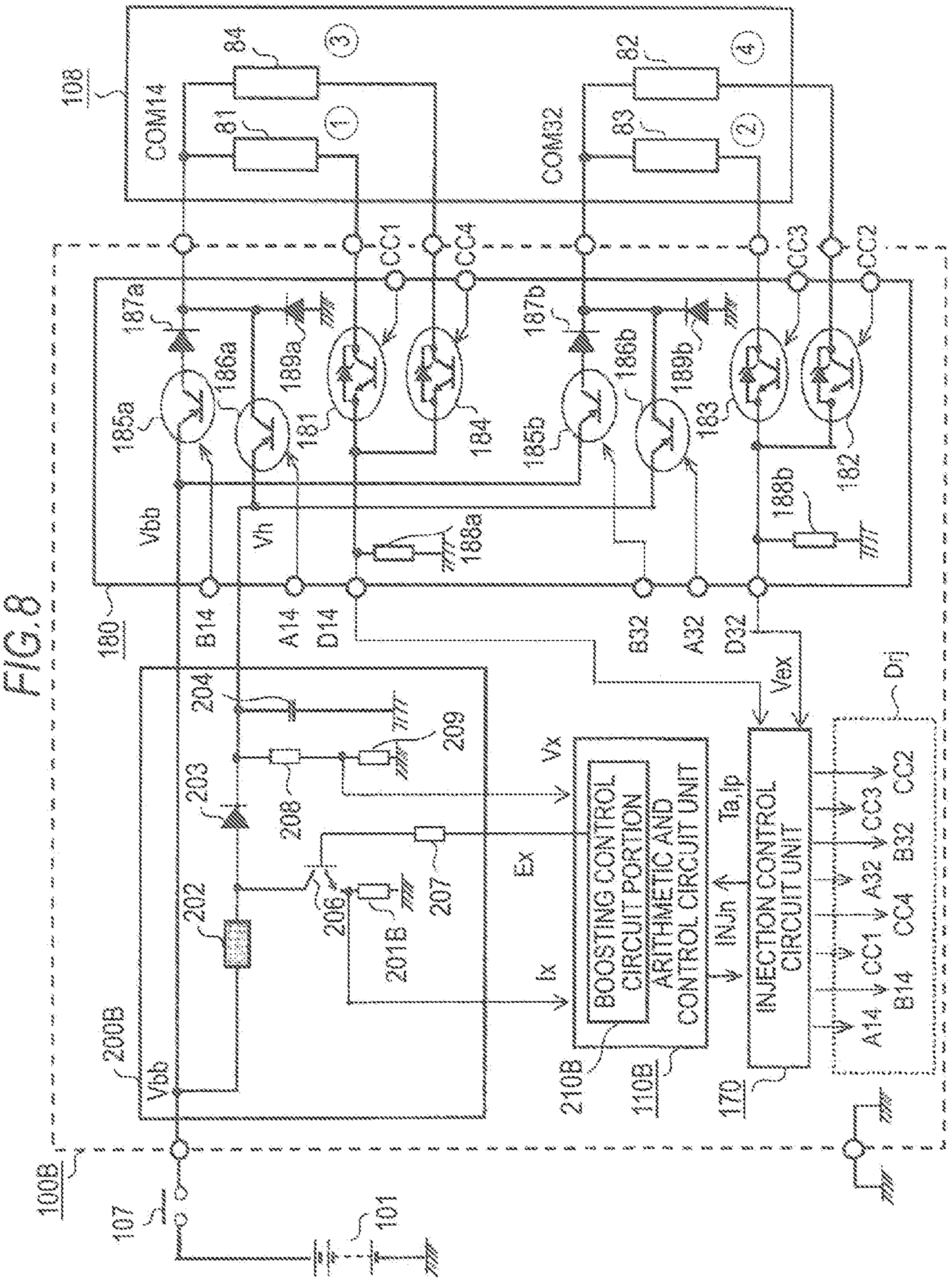
FIG. 8 is a detailed block diagram of some control circuits shown in FIG. 7.

Next, a description will be made of FIG. 8 which is a block diagram of some control circuits shown in FIG. 7. In FIG. 8, a boosting circuit unit 200B has the same configuration as the boosting circuit unit 200A of FIG. 2, but a current detection resistor 201B is connected to an emitter circuit of the boosting opening and closing element 206. Therefore, the boosting circuit unit 200B is formed by main circuits including an inductive element 202, a charging diode 203, a high-voltage capacitor 204, which are connected in series to each other and to which the load power supply voltage Vbb is applied, and a series circuit of a boosting opening and closing element 206 and a current detection resistor 201B connected between the inductive element 202 and a ground circuit. If a current flowing through the inductive element 202 when the boosting opening and closing element 206 is closed becomes a predetermined value or more, the boosting opening and closing element 206 is opened, and thus electromagnetic energy stored in the inductive element 202 is released to the high-voltage capacitor 204 via the charging diode 203. The boosted high voltage Vh which is a charged voltage of the high-voltage capacitor 204 is increased to a targeted predetermined voltage by intermittently driving the boosting opening and closing element 206 multiple times.

In addition, a voltage across both ends of the current detection resistor 201B, which can detect a driving current flowing through the inductive element 202 only when the boosting opening and closing element 206 is closed, and is input to the high-speed A/D converter 115 provided in the arithmetic and control circuit unit 110B as an inductive element current Ix. In addition, a voltage across both ends of the high-voltage capacitor 204 is divided by dividing resistors 208 and 209 and is input to another input channel of the high-speed A/D converter 115 as a boosted detection voltage Vx. The boosting control circuit portion 210B described later generates a boosting control signal Ex according to values of the inductive element current Ix and the boosted detection voltage Vx which are digitally converted by the high-speed A/D converter 115 so as to open and close the boosting opening and closing element 206 via a driving resistor 207.

Figure 9:
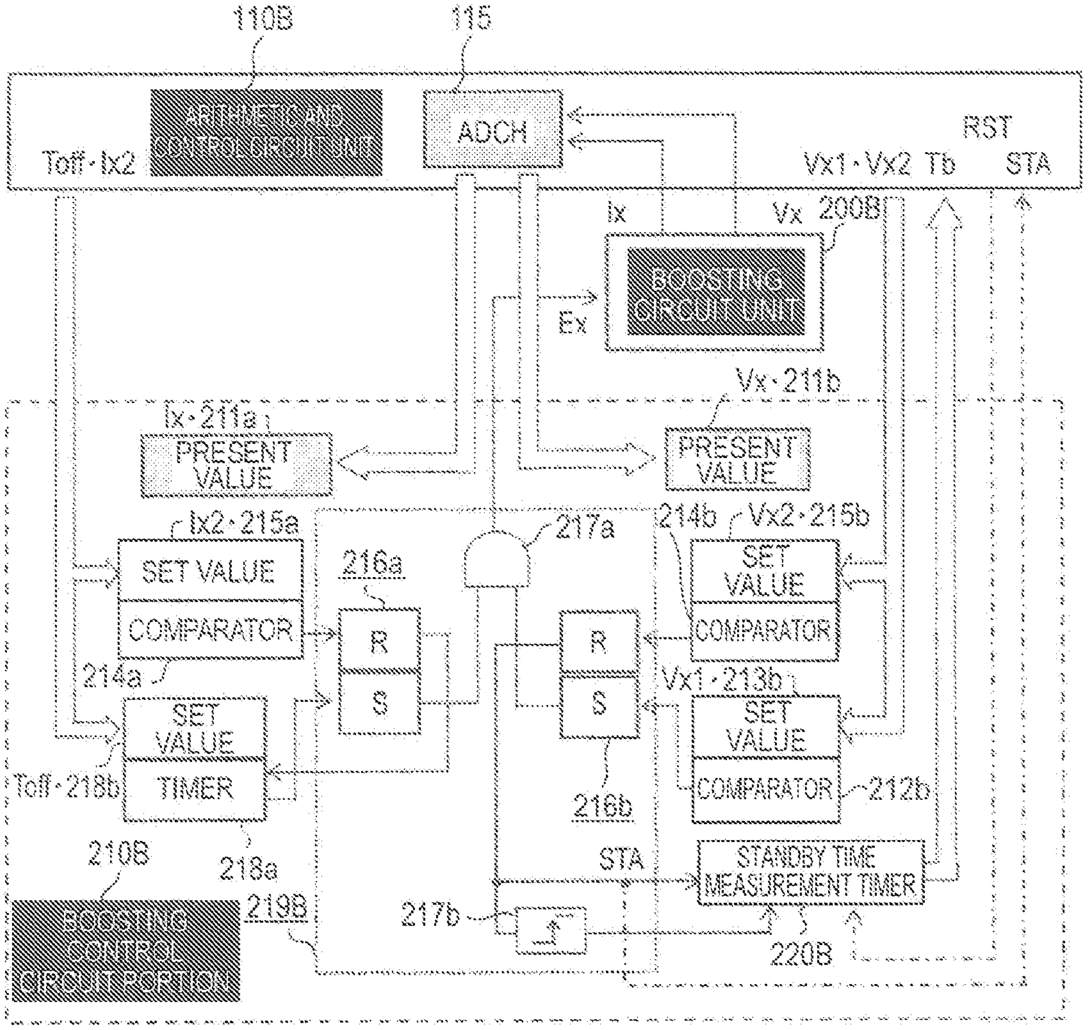
FIG. 9 is a detailed block diagram of the boosting control circuit portion shown in FIG. 7.

Next, a description will be made of FIG. 9 which is a detailed block diagram of the boosting control circuit portion 210B shown in FIG. 7. In FIG. 9, in the same manner as the boosting control circuit portion 210A of FIG. 3, the boosting control circuit portion 210B includes a current present value register 211*a* which stores a present value of the inductive element current Ix which is digitally converted by the high-speed A/D converter 115, a voltage present value register 211*b* which stores a present value of the boosted detection voltage Vx, a higher-side current set register 215*a* in which a target higher-side current Ix2 is set by the microprocessor 111, and a higher-side current comparator 214*a* which compares a numerical value stored in the higher-side current set register 215*a* with a present value of the current present value register 211*a*. Further, a time limit set register 218*b* in which a cutoff time Toff is set by the microprocessor 111 sets a cutoff time of the boosting opening and closing element 206 in cooperation with a cutoff time set timer 218*a* which measures the time when a reset output of a flip-flop circuit 216*a* described later is being generated.

In addition, for example, in a case where the cutoff time set timer 218*a* adds and counts a clock signal (not shown) beginning from an initial value 0, the cutoff time set timer 218*a* generates a time-up signal when a set value of the time limit set register 218*b* matches a present counted value of the cutoff time set timer 218*a*. However, in a case where the cutoff time set timer 218*a* is a subtraction counter, a present value register of the subtraction counter is also used as the time limit set register 218*b*, and the microprocessor 111 transmits a cutoff time Toff to the present value register of the subtraction counter so as to be set. In addition, the cutoff time set timer 218*a* may generate a time-up signal when a present value of the present value register becomes zero. Although the cutoff time Toff may be set to a predetermined fixed time, the time required for the inductive element 202 to release electromagnetic energy to the high-voltage capacitor 204 is inversely proportional to a charged voltage of the high-voltage capacitor 204. Therefore, it is preferable that at least two types of cutoff time Toff be used by setting the cutoff time Toff to a long time when driving starts until a value of the boosted high voltage Vh arrives at the minimum voltage Vx0 of (H) of FIG. 4 and setting the cutoff time Toff to a short time in a normal driving state of exceeding the minimum voltage Vx0, in order to prevent occurrence of wasted standby time.

In the same manner as the boosting control circuit portion 210A, the boosting control circuit portion 210B further includes a lower-side voltage set register 213*b* in which a target lower-side voltage Vx1 is set by the microprocessor 111, a higher-side voltage set register 215*b* in which a target higher-side voltage Vx2 is set, a lower-side voltage comparator 212*b* which compares a numerical value stored in the lower-side voltage set register 213*b* with a present value of the voltage present value register 211*b*, and a higher-side voltage comparator 214*b* which compares a numerical value stored in the higher-side voltage set register 215*b* with a present value of the voltage present value register 211*b*. A first flip-flop circuit 216*a* is set by a time-up output of the cutoff time set timer 218*a* and is reset by an output of the higher-side current comparator 214*a*, and a second flip-flop circuit 216*b* is set by an output of the lower-side voltage comparator 212*b* and is reset by an output of the higher-side voltage comparator 214*b*. A logical product element 217*a* outputs the boosting control signal Ex with a logical level "H" when both of a set output of the first flip-flop circuit 216*a* and a set output of the second flip-flop circuit 216*b* are in a logical level "H", thereby driving the boosting opening and closing element 206 so as to be closed via the driving resistor 207 of FIG. 8.

Therefore, if a value of the boosted detection voltage Vx temporarily becomes equal to or more than the target higher-side voltage Vx2, a set output of the second flip-flop circuit 216*b* is in a logical level "L" until the value becomes equal to or lower than the target lower-side voltage Vx1, and this inhibits generation of the boosting control signal Ex. If the value of the boosted detection voltage Vx temporarily becomes equal to or lower than the target lower-side voltage Vx1, a set output of the second flip-flop circuit 216*b* is in a logical level "H" until the value becomes equal to or more than the target higher-side voltage Vx2, and this allows the boosting control signal Ex to be generated. On the other hand, when the boosting opening and closing element 206 is opened and then the cutoff time Toff has elapsed, an output of the first flip-flop circuit 216*a* is in a logical level "H" until a value of the inductive element current Ix becomes equal to or more than the target higher-side current Ix2, and thus the boosting control signal Ex can be generated. Whether or not a logical level of the boosting control signal Ex actually becomes "H" is determined by a state of the second flip-flop circuit 216*b*. In addition, if the value of the inductive element current Ix becomes equal to or more than the target higher-side current Ix2, an output of the first flip-flop circuit 216*a* is in a logical level "L" until the cutoff time Toff set in the cutoff time set timer 218*a* elapses, and thus generation of the boosting control signal Ex stops.

A standby time measurement timer 220B measures a charging standby time for the high-voltage capacitor 204 in response to a clocking command signal STA which has a logical level "H" in a period when a logical level of the reset output of the second flip-flop circuit 216*b* is "H", and charging of the high-voltage capacitor 204 is completed and is paused by performing opening and closing control on the boosting opening and closing element 206. The standby time measurement timer 220B is initialized in advance by a rising differential circuit 217*b* for a reset output of the second flip-flop circuit 216*b* when clocking starts. In addition, the clocking command signal STA and a present value of the standby time measurement timer 220B are transmitted to the microprocessor 111, and thus the microprocessor 111 can monitor whether or not charging of the high-voltage capacitor 204 is completed through the clocking command signal STA. However, if the microprocessor 111 reads a charging allowance time Tb which is a present value of the standby time measurement timer 220B immediately before generating the next valve opening command signals INJ81 to INJ84, the clocking command signal STA is not required to be monitored. In addition, the standby time measurement timer 220B may be initialized by a reset command signal RST which is obtained through a logical sum of rising differential signals of valve opening command signals INJ81 to INJ84 generated by the microprocessor.

(2) Detailed Description of Effects and Operations

Hereinafter, in the device according to Embodiment 2 of this invention configured as in FIG. 7, an outline of effects and operations will be described based on differences from those in FIG. 1. In addition, the time chart of FIG. 4 illustrating operations and the flowcharts of FIGS. 5 and 6 illustrating operations are applied to Embodiment 2 as they are except for some differences. First, in FIG. 7, when a power supply switch (not shown) is closed, the control power supply switch 102 which is an output contact point of the main power supply relay is closed, and thus the main power supply voltage Vba is applied to the in-vehicle engine control device 100B. As a result, the constant voltage source 120 generates the control power supply voltage Vcc of, for example, DC 5 V, and the microprocessor 111 starts a control operation. The microprocessor 111 closes the load power supply switch 107 by biasing the load power supply relay according to operation states of the opening and closing sensor group 103, the low-speed analog sensor group 104, and the analog sensor group 105 with a high rate of change, and content of a control program stored in the nonvolatile program memory 113B. In addition, the microprocessor 111 generates the load driving command signal Dri for the electrical load group 106, and generates the opening and closing command signal Drj via the injection control circuit unit 170 for the electromagnetic coils 81 to 84 which are specific electrical loads of the electrical load group 106.

In addition, in FIG. 8, there is no difference in that the boosting circuit unit 200B charges the high-voltage capacitor 204 to a high voltage through an intermittent operation of the boosting opening and closing element 206, but the current detection resistor 201B does not measure a current when the inductive element 202 charges the high-voltage capacitor 204, and thus a connection circuit of the current detection resistor 201B is simplified. In addition, in FIG. 9, the boosting control circuit portion 210B generates the boosting control signal Ex by using the first flip-flop circuit 216*a* which is operated based on the target higher-side current Ix2 and the cutoff time Toff and the second flip-flop circuit 216*b* which is operated based on the target higher-side voltage Vx2 and the target lower-side voltage Vx1 such that the boosting opening and closing element 206 is controlled so as to be opened and closed. The standby time measurement timer 220B measures not the charging necessary time Tc shown in (H) of FIG. 4 but the charging allowance time Tb. A result obtained by subtracting a measured charging allowance time Tb from a previous fuel injection interval Ts equals to a previous charging necessary time Tc.

Although the four-cylinder engine has been described in the above description, the same applies to a six-cylinder or eight-cylinder engine. The electromagnetic coils which drive the fuel injection solenoid valves provided in the respective cylinders are divided into a first group and a second group which alternately perform fuel injection, and the valve opening command signals INJn do not overlap each other in time in the same group. However, a third group or a fourth group may be added as necessary. In addition, although, in the above description, a symbol of the junction transistor is used as an opening and closing element, in a case of a power transistor, the junction transistor may be replaced with a field effect transistor which is generally used. Further, although, in the above description, the lower-side current set register 213*a*, the lower-side voltage set register 213*b*, the higher-side current set register 215*a*, the higher-side voltage set register 215*b*, and the time limit set register 218*b* are provided inside the boosting control circuit portions 210A and 210B, the RAM 112 may be used as a set register by using a direct memory access controller.

(3) Main Points and Features of Embodiment 2

As is clear from the above description, an in-vehicle engine control device according to Embodiment 2 of this invention is an in-vehicle engine control device 100B including an solenoid valve driving control circuit unit 180 for a plurality of electromagnetic coils 81 to 84 for driving solenoid valves; a boosting circuit unit 200B which generates the boosted high voltage Vh for performing rapid excitation on the electromagnetic coils 81 to 84; an arithmetic and control circuit unit 110B which has a microprocessor 111 as a main constituent element; and an injection control circuit unit 170 performs relay between the microprocessor 111 and the solenoid valve driving control circuit unit 180, in order to sequentially drive fuel injection solenoid valves 108 provided in respective cylinders of a multi-cylinder engine. The arithmetic and control circuit unit 110B includes a multi-channel A/D converter 114*a* operated at low speed, which cooperates with the microprocessor 111, a high-speed A/D converter 115 with a plurality of channels, and a boosting control circuit portion 210B. The microprocessor 111 determines generation moments of valve opening command signals INJn (where n is 81 to 84) for the electromagnetic coils 81 to 84 and a valve opening command generation period Tn on the basis of signal voltages of at least some of an air flow sensor, an accelerator position sensor, and a fuel pressure sensor included in a low-speed analog sensor group 104, which are input to the multi-channel A/D converter 114*a*, and operations of a crank angle sensor and an engine speed sensor of an opening and closing sensor group 103.

The boosting circuit unit 200B includes an inductive element 202 which is intermittently excited by a boosting opening and closing element 206 from an in-vehicle battery 101; a current detection resistor 201B which is connected in series to the inductive element; and a high-voltage capacitor 204 which is charged by releasing electromagnetic energy stored in the inductive element 202 via a charging diode 203 when an inductive element current Ix proportional to a voltage across both ends of the current detection resistor is input to the arithmetic and control circuit unit 110B, the boosting opening and closing element 206 is controlled so as to be opened and closed in response to a boosting control signal Ex generated by the boosting control circuit portion 210B, and the boosting opening and closing element 206 is opened. A divided voltage of the voltage across both ends of the high-voltage capacitor 204 is input to the arithmetic and control circuit unit 110B as a boosted detection voltage Vx, an analog signal voltage proportional to the inductive element current Ix and the boosted detection voltage Vx is input to the high-speed A/D converter 115, and data which is digitally converted by the high-speed A/D converter is stored in a current present value register 211*a* and a voltage present value register 211*b*.

The boosting control circuit portion 210B includes a higher-side current set register 215*a* and a higher-side voltage set register 215*b* which are transmitted from the microprocessor 111 and are set; a higher-side current comparator 214*a* and a higher-side voltage comparator 214*b* which respectively compare the magnitudes of numerical values stored in the set registers and numerical values stored in the current present value register 211*a* and voltage present value register 211*b*; and a logical circuit portion 219B. The logical circuit portion 219B compares a value of a target higher-side current Ix2 stored in the higher-side current set register 215*a* with a value of the inductive element current Ix transmitted from the boosting circuit unit 200B by using the higher-side current comparator 214*a*. When the value of the inductive element current Ix is smaller than the value of the target higher-side current Ix2, the logical circuit portion 219A activates the boosting control signal Ex such that the boosting opening and closing element 206 is driven so as to be closed. In addition, the logical circuit portion 219B compares a value of a target higher-side voltage Vx2 stored in the higher-side voltage set register 215*b* with a value of the boosted detection voltage Vx transmitted from the boosting circuit unit 200B by using the higher-side voltage comparator 214*b*. When the value of the boosted detection voltage Vx is smaller than the value of the target higher-side voltage Vx2, the logical circuit portion 219B makes the boosting control signal Ex valid such that the boosting opening and closing element 206 is driven so as to be closed.

Therefore, the arithmetic and control circuit unit 110B is divided into a data processing function of setting numerical values of the target higher-side current Ix2 and the target higher-side voltage Vx2 in the boosting circuit unit 200B by using the microprocessor 111 and converting numerical values of the inductive element current Ix and boosted detection voltage Vx by using the high-speed A/D converter 115, and a digital logic control function of performing negative feedback control so as to obtain a relationship in which a target value as which the numerical value is set is the same as a monitored present value into which the numerical value is converted, by using the boosting control circuit portion 210B.

The current detection resistor 201B of the boosting circuit unit 200B is at least connected to a position through which a storage charging current flows when the boosting opening and closing element 206 is closed and thus the inductive element 202 is excited and stores energy. The boosting control circuit portion 210B further includes a cutoff time set timer 218*a* having a time limit set register 218*b* which is a comparison set register for addition clocking or a present value register for subtraction clocking. The logical circuit portion 219B causes the boosting opening and closing element 206 to be opened when the boosting opening and closing element 206 is closed and thus a value of the inductive element current Ix is equal to or more than a value of the target higher-side current Ix2, and generates again the boosting control signal Ex when an open time of the boosting opening and closing element exceeds a cutoff time Toff set in the time limit set register 218*b*. A cutoff time Toff transmitted from the microprocessor 111 or a fixed constant value is stored in the time limit set register 218*b*.

As above, in relation to a third aspect of this invention, the boosting control circuit portion includes the cutoff time setting timer for determining a cutoff time Toff of the boosting opening and closing element. Therefore, there is a feature that, even if a release current of electromagnetic energy, flowing from the inductive element to the high-voltage capacitor, is not detected, an expected time when the release current substantially becomes zero is stored in the time limit set register, and thereby it is possible to easily performing opening and closing control of the boosting opening and closing element. In addition, in a case where the cutoff time Toff is set by the microprocessor, there is a feature that the cutoff time Toff at the boosting start point is set to be large, and if a charged voltage of the high-voltage capacitor increases, the cutoff time Toff is set to be small, and thereby it is possible to reduce a wasted time for an unconducted inductive element.

The boosting control circuit portion 210B further includes a lower-side voltage set register 213*b*; and a lower-side voltage comparator 212*b* which compares the magnitudes of a numerical value stored in the set register and a numerical value stored in the voltage present value register 211*b*. The logical circuit portion 219B invalidates the boosting control signal Ex such that the boosting opening and closing element 206 is opened when the a value of the boosted detection voltage Vx is equal to or more than a value of the target higher-side voltage Vx2. In addition, the logical circuit portion 219B compares a value of the target lower-side voltage Vx1 stored in the lower-side voltage set register 213*b* with a value of the boosted detection voltage Vx transmitted from the boosting circuit unit 200B by using the lower-side voltage comparator 212*b*, and makes the boosting control signal Ex valid such that the boosting opening and closing element 206 is driven so as to be closed when a value of the boosted detection voltage Vx is smaller than a value of the target lower-side voltage Vx1. Individually set data which is a value of the target lower-side voltage Vx1 transmitted from the microprocessor 111 is stored in the lower-side voltage set register 213*b*, or interlocked set data which is a value obtained by subtracting a predetermined difference value from a value of the target higher-side voltage Vx2 stored in the higher-side voltage set register 215*b* is stored therein. The difference value is larger than an increment voltage which is charged in the high-voltage capacitor 204 through single current blocking of the inductive element 202, and is smaller than a discharged voltage Vx2-Vx0 of the capacitor 204 according to single rapid excitation for the electromagnetic coils 81 to 84.

As above, in relation to the fourth aspect of this invention, the boosting control circuit portion includes the lower-side voltage set register and the lower-side voltage comparator, causes the boosting opening and closing element to be opened when the boosted detection voltage Vx rises to pass the target higher-side voltage Vx2, and makes the boosting control signal Ex valid when the boosted detection voltage Vx falls to pass the target lower-side voltage Vx1, thereby controlling the boosting opening and closing element so as to be opened and closed depending on the magnitude of the inductive element current Ix.

Therefore, there is the same feature as in Embodiment 1.

The logical circuit portion 219B includes first and second flip-flop circuits 216*a* and 216*b*; and a logical product element 217*a*. The first flip-flop circuit 216*a* is set when an open time of the boosting opening and closing element 206 is equal to or more than a predetermined cutoff time Toff, and is reset when the value of the inductive element current Ix is equal to or more than the predetermined target higher-side current Ix2. The second flip-flop circuit 216*b* is set when a value of the boosted detection voltage Vx is equal to or less than a value of a predetermined target lower-side voltage Vx1, and is reset when the value of the boosted detection voltage Vx is equal to or more than the predetermined target higher-side voltage Vx2. The logical product element 217*a* makes the boosting control signal Ex valid such that the boosting opening and closing element 206 is driven so as to be closed when both of set outputs of the first and second flip-flop circuits 216*a* and 216*b* are logic “1”. As above, in relation to the fifth aspect of this invention, the boosting control circuit portion includes the first flip-flop circuit which is operated according to the magnitude of the inductive element current Ix and the second flip-flop circuit which is operated according to the magnitude of the boosted detection voltage Vx, and intermittently excites the inductive element by using the boosting opening and closing element until a targeted boosted high voltage Vh is obtained. Therefore, there is the same feature as in Embodiment 1.

The solenoid valve driving control circuit unit 180 includes first and second low voltage opening and closing elements 185*a* and 185*b* which connect the electromagnetic coils 81 and 84 of a first group and the electromagnetic coils 83 and 82 of a second group, alternately performing fuel injection, to the in-vehicle battery 101 for each group; first and second high voltage opening and closing element 186*a* and 186*b* which are connected to an output of the boosting circuit unit 200B; opening and closing elements for power supply control which include a plurality of selective opening and closing elements 181 to 184 individually connected to the electromagnetic coils 81 to 84; and first and second current detection resistors 188*a* and 188*b* which are connected in series to the electromagnetic coils 81 and 84 of the first group and the electromagnetic coils 83 and 82 of the second group. The injection control circuit unit 170 generates the valve opening command signal INJn, and opening and closing command signals Drj including first and second high voltage opening and closing command signals A14 and A32 for the first and second high voltage opening and closing elements 186*a* and 186*b*, first and second low voltage opening and closing command signals B14 and B32 for the first and second low voltage opening and closing element 185*a* and 185*b*, and selective opening and closing command signals CC1 to CC4 for the selective opening and closing elements 181 to 184, in response to a current detection signal Vex by the first and second current detection resistors 188*a* and 188*b*. The current detection signal Vex is input to the injection control circuit unit 170 as a current detection signal Dex which is digitally converted by the high-speed A/D converter 115. The multi-channel A/D converter 114*a* is a sequential conversion type A/D converter which is operated at low speed, whereas the high-speed A/D converter 115 is a delta sigma type A/D converter. The arithmetic and control circuit unit 110B is constituted by an integrated circuit element of one chip or two chips including all of the multi-channel A/D converter 114*a*, the high-speed A/D converter 115, the boosting control circuit portion 210A or 210B, and the injection control circuit unit 170.

As above, in relation to the sixth aspect of this invention, an analog signal handled by the boosting control circuit portion and the injection control circuit unit is digitally converted by the delta sigma type A/D converter which is operated at high speed. Therefore, the boosting control circuit portion and the injection control circuit unit are digitalized, and are thereby integrated with the arithmetic and control circuit unit including the microprocessor, or form an integrated circuit element capable of easily performing interconnection. Therefore, there is the same feature as in Embodiment 1.

Main Points and Features of Embodiments 1 and 2

As is clear from the above description, in an in-vehicle engine control method used for the in-vehicle engine control device according to Embodiment 1 or 2, the boosting control circuit portion 210A or 210B further includes a boosting period measurement timer 220A which measures a charging necessary time Tc after the valve opening command signals INJn (where n is 81 to 84) are generated until a charged voltage of the high-voltage capacitor 204 is reduced to the minimum voltage Vx0 due to rapid excitation for the electromagnetic coils 81 to 84 and arrives at the target higher-side voltage Vx2 through recharging, or a standby time measurement timer 220B which measures a charging allowance time Tb after the charged voltage arrives at the target higher-side voltage Vx2 until the next valve opening command signals INJn are generated. The program memory 113A or 113B cooperating with the microprocessor 111 includes a control program which is current reduction adjusting means 507. The current reduction adjusting means 507 calculates the present charging allowance time Tb based on a deviation Ts−Tc between the charging necessary time Tc previously measured by the boosting period measurement timer 220A and a fuel injection interval Ts until the next valve opening command signals INJn are generated. Alternatively, the current reduction adjusting means 507 reads the previous charging allowance time Tb measured by the standby time measurement timer 220B, calculates the present charging allowance time Tb corresponding to the present fuel injection interval Ts, corrects a value of the target higher-side current Ix2 transmitted to the higher-side current set register 215*a* so as to be decreased when the present charging allowance time Tb is equal to or more than a predetermined value, and corrects a value of the target higher-side current Ix2 so as to be increased when the present charging allowance time Tb is smaller than a predetermined value. In addition, the high-voltage capacitor 204 is charged using a suppression target higher-side current Ix20.

In an in-vehicle engine control method used for the in-vehicle engine control device according to Embodiment 1 of this invention, a clocking present value of the boosting period measurement timer 220A is reset by a reset command signal RST which is obtained through a logical sum of rising signals of the valve opening command signals INJn generated by the microprocessor 111. The charging necessary time Tc is the time measured right after the reset is completed until a charged voltage of the high-voltage capacitor 204 arrives at the target higher-side voltage Vx2. When the fuel injection interval Ts after the previous valve opening command signals INJn are generated until the present valve opening command signals INJn are generated is set as one valve opening cycle, the microprocessor 111 reads the charging necessary time Tc in the previous valve opening cycle, measured by the boosting period measurement timer 220A before the present valve opening command signals INJn are generated. The boosted high voltage Vh, which is obtained by charging the high-voltage capacitor 204 based on the target higher-side current Ix2 corrected by the current reduction adjusting means 507 in the present valve opening cycle, is used for fuel injection in the next valve opening cycle.

As above, in relation to an eighth aspect of this invention, the microprocessor reads and resets a measured value of the boosting period measurement timer in synchronization with the valve opening command signals generated by the microprocessor, and the boosting period measurement timer measures the next charging necessary time in synchronization with the valve opening command signals. Therefore, there is a feature that the microprocessor sets the fuel injection interval Ts which is scheduled this time as a chargeable time, and can simply correct the present target higher-side current Ix2 by comparing the chargeable time and the previous charging necessary time Tc. In addition, the charging necessary time Tc described here includes a high voltage supply period when rapid excitation is performed on the electromagnetic coils and a current attenuation period of the electromagnetic coils. In these periods, intermittence of the boosting opening and closing element may stop such that charging of the high-voltage capacitor is paused, or the charging may be continuously performed. If clocking starts in synchronization with the reset signal in either case, the charging allowance time Tb can be simply calculated by subtracting the charging necessary time Tc from the fuel injection interval Ts.

In an in-vehicle engine control method used for the in-vehicle engine control device according to Embodiment 2 of this invention, the standby time measurement timer 220B is a timer measuring a charging pause time which is time from a time point when a charged voltage of the high-voltage capacitor 204 is reset before arriving at the target higher-side voltage Vx2 to a time point when the charged voltage is reduced to a predetermined threshold value or less due to rapid power supply to the electromagnetic coils 81 to 84 and is thus required to be recharged after arriving at the target higher-side voltage Vx2, or time until the microprocessor 111 generates the next valve opening command signals INJn. The predetermined threshold value is a target lower-side voltage Vx1 which is obtained by subtracting a difference value larger than a voltage drop due to self-discharge of the high-voltage capacitor 204 from the target higher-side voltage Vx2 in the charging pause time zone. When the fuel injection interval Ts after the previous valve opening command signals INJn are generated until the present valve opening command signals INJn are generated is set as one valve opening cycle, the microprocessor 111 reads the charging allowance time Tb in the previous valve opening cycle, measured by the standby time measurement timer 220B before the present valve opening command signals INJn are generated. The boosted high voltage Vh, which is obtained by charging the high-voltage capacitor 204 based on the target higher-side current Ix2 corrected by the current reduction adjusting means 507 in the present valve opening cycle, is used for fuel injection in the next valve opening cycle.

As above, in relation to a ninth aspect of this invention, the microprocessor reads a previously measured value of the standby time measurement timer in synchronization with the valve opening command signals generated by the microprocessor, then corrects the present target higher-side current Ix2, and uses the boosted high voltage Vh according thereto for the next rapid excitation. Therefore, there is a feature that the microprocessor can simply correct the present target higher-side current Ix2 by comparing a variation time between the previous fuel injection interval Ts and the fuel injection interval Ts scheduled this time with the previous charging allowance time Tb detected by the standby time measurement timer.

In an in-vehicle engine control method used for the in-vehicle engine control device according to Embodiment 1 or 2 of this invention, the program memory 113A or 113B cooperating with the microprocessor 111 includes a control program which is current rapid increase command means 506. The current rapid increase command means 506 is operated based on an extent of depression of an accelerator pedal detected by an accelerator position sensor which is one analog sensor of a low-speed analog sensor group 104 and a signal interval of an engine speed sensor which is one opening and closing sensor of an opening and closing sensor group 103, is executed in a case where a rapid decrease of a fuel injection interval is predicted due to a rapid increase of the engine speed or a rapid decrease of a fuel injection interval is predicted due to a plurality of divided injections in a single fuel injection period, and is means for setting the target higher-side current Ix2 to be rapidly increased. As a value of the target higher-side current set to be rapidly increased, at least two kinds of set values including a rated higher-side current Ix3 or an increase higher-side current Ix4 can be selected. The rated higher-side current Ix3 is a set current which is aimed at completion of charging of the high-voltage capacitor 204 until the next rapid excitation moment even in a case where a voltage of the in-vehicle battery 101 is low and the engine speed is high. Whereas the suppression target higher-side current Ix20 is a value equal to or less than the rated higher-side current Ix3, the increase higher-side current Ix4 is applied when the divided injections are performed and is a short-time rated set current larger than the rated higher-side current Ix3.

As above, according to a tenth aspect of this invention, the target higher-side current is set to be rapidly increased in a case where a rapid decrease of the fuel injection interval is predicted. Therefore, there is a feature that, under the condition in which the target higher-side current for the inductive element is immediately rapidly increased to the rated higher-side current Ix3 in a case where the fuel injection interval is rapidly decreased, the inductive element current can be suppressed for gradual decrease such that the charging necessary time corresponds to the fuel injection interval when cruising driving is performed at relatively stable normal engine speed, and, in a case of divided injections, the increase higher-side current Ix4 is applied only when continuous injection is performed for a short time, and the high-voltage capacitor is normally charged by the rated higher-side current Ix3 or the suppression target higher-side current which is smaller than the rated higher-side current Ix3, thereby suppressing a temperature increase of the boosting circuit unit. In addition, there is a relationship in which the charging necessary time is decreased in inverse proportion to the applied target higher-side current Ix2 but power consumption in the inductive element is increased in proportion to the target higher-side current Ix2, and thus to suppress the target higher-side current Ix2 in the cruising driving achieves a notable effect for reducing power consumption and a temperature increase of the boosting circuit unit.

In an in-vehicle engine control method used for the in-vehicle engine control device according to Embodiment 1 or 2 of this invention, the injection control circuit unit 170 includes at least one of a rapid excitation period measurement timer 171 and a peak hold circuit 172 of a rapid excitation current. The program memory 113A or 113B cooperating with the microprocessor 111 includes a control program which is boosted high voltage correction command means 505. The rapid excitation period measurement timer 171 measures an actually measured arrival time Ta after a first or second high voltage opening and closing element **186*a* or 186*b* connected between the boosting circuit unit 200A or 200B and the first or second electromagnetic coils 81 and 84 or 82 and 83 is driven so as to be closed until an excitation current Iex for the electromagnetic coils 81 to 84 arrives at a targeted set cutoff current Ia. The peak hold circuit 172 measures and stores an actually measured peak current Ip which is transiently overshot due to an opening response delay of the high voltage opening and closing element when an opening command is given to the first or second high voltage opening and closing element 186*a* or 186*b* by the excitation current Iex arriving at the set cutoff current Ia, and then starts to be attenuated. The boosted high voltage correction command means 505 corrects a value of the target higher-side voltage Vx2 to a lower side within a predetermined limit when the actually measured arrival time Ta is shorter than a predetermined target arrival time Ta0, or the actually measured peak current Ip is larger than a predetermined target limitation peak current Ip0, and corrects a value of the target higher-side voltage Vx2 to a higher side within a predetermined limit when the actually measured arrival time Ta is longer than the predetermined target arrival time Ta0**.

As above, in relation to an eleventh aspect of this invention, a rising time characteristic or an overshoot current characteristic of the rapid excitation current is monitored, and a target value of the boosted high voltage Vh is adjusted. Therefore, there is a feature that, when the electromagnetic coils have low temperature and low resistance in starting of driving, the boosted high voltage Vh is suppressed such that the rising characteristic of the rapid excitation current matches a predetermined reference characteristic, and when the electromagnetic coils have high temperature and high resistance due to continuous heavy-load driving, the boosted high voltage Vh is increased such that the rising characteristic of the rapid excitation current matches a predetermined reference characteristic, and, as a result, a uniform valve opening period can be secured.

In an in-vehicle engine control method used for the in-vehicle engine control device according to Embodiment 1 or 2 of this invention, the program memory 113A or 113B cooperating with the microprocessor 111 includes a control program which is valve opening period adjustment means 504. The valve opening period adjustment means 504 is applied to a case where the actually measured arrival time Ta cannot be adjusted so as to be a predetermined target arrival time Ta0 within an increase and decrease correction limit of the target higher-side voltage Vx2 by the boosted high voltage correction command means 505. The valve opening period adjustment means 504 corrects a valve opening command generation period Tn which is a generation period of the valve opening command signals INJn so as to extend when rising of the rapid excitation current is late, and corrects the valve opening command generation period Tn so as to be shortened when rising of the rapid excitation current is early.

As above, in relation to a twelfth aspect of this invention, when a fluctuation of the rising time characteristic of the rapid excitation current cannot be corrected within an adjustable range of the boosted high voltage, control is performed so as to obtain a targeted valve opening period by adjusting the valve opening command generation period. Therefore, there is a feature that control accuracy of a valve opening period can be maintained in a case where a battery voltage is abnormally reduced, or a targeted boosted high voltage cannot be obtained due to abnormal overheating of the boosting circuit unit.

Various modifications and alterations of this invention will be apparent to those skilled in the art without departing from the scope and spirit of this invention, and it should be understood that this is not limited to the illustrative embodiments set forth herein.

What is claimed is:

1. An in-vehicle engine control device comprising:

a solenoid valve driving control circuit unit for a plurality of electromagnetic coils for driving solenoid valves in order to sequentially drive the solenoid valves for fuel injection provided in respective cylinders of a multi-cylinder engine;

a boosting circuit unit that generates a boosted high voltage for performing rapid excitation on the electromagnetic coils;

an arithmetic and control circuit unit that has a microprocessor as a main constituent element; and an injection control circuit unit that performs relay between the microprocessor and the solenoid valve driving control circuit unit, wherein the arithmetic and control circuit unit includes a multi-channel A/D converter that is operated at low speed, cooperating with the microprocessor;

a high-speed A/D converter with a plurality of channels; and a boosting control circuit portion, the microprocessor determines generation moments of valve opening command signals INJn for the electromagnetic coils and a valve opening command generation period Tn on the basis of signal voltages of at least some of an air flow sensor, an accelerator position sensor, and a fuel pressure sensor included in a low-speed analog sensor group, which are input to the multi-channel A/D converter, and operations of a crank angle sensor and an engine speed sensor of an opening and closing sensor group, the boosting circuit unit includes an inductive element that is intermittently excited by a boosting opening and closing element from an in-vehicle battery;

a current detection resistor that is connected in series to the inductive element; and a high-voltage capacitor that is charged by releasing electromagnetic energy stored in the inductive element via a charging diode when an inductive element current Ix proportional to a voltage across both ends of the current detection resistor is input to the arithmetic and control circuit unit, the boosting opening and closing element is controlled so as to be opened and closed in response to a boosting control signal Ex generated by the boosting control circuit portion, and the boosting opening and closing element is opened, a divided voltage of the voltage across both ends of the high-voltage capacitor is input to the arithmetic and control circuit unit as a boosted detection voltage Vx, an analog signal voltage proportional to the inductive element current Ix and the boosted detection voltage Vx is input to the high-speed A/D converter, and data which is digitally converted by the high-speed A/D converter is stored in a current present value register and a voltage present value register, the boosting control circuit portion includes a higher-side current set register and a higher-side voltage set register that are transmitted from the microprocessor so as to be set;

a higher-side current comparator and a higher-side voltage comparator that respectively compare the magnitudes of numerical values stored in the set registers and numerical values stored in the current present value register and voltage present value register; and a logical circuit portion, the logical circuit portion compares a value of a target higher-side current Ix2 stored in the higher-side current set register with a value of the inductive element current Ix transmitted from the boosting circuit unit by the higher-side current comparator, and when the value of the inductive element current Ix is smaller than the value of the target higher-side current Ix2, the logical circuit portion activates the boosting control signal Ex such that the boosting opening and closing element is driven so as to be closed, the logical circuit portion compares a value of a target higher-side voltage Vx2 stored in the higher-side voltage set register with a value of the boosted detection voltage Vx transmitted from the boosting circuit unit by using the higher-side voltage comparator, and when the value of the boosted detection voltage Vx is smaller than the value of the target higher-side voltage Vx2, the logical circuit portion makes the boosting control signal Ex valid such that the boosting opening and closing element is driven so as to be closed, and the arithmetic and control circuit unit is divided into a data processing function of setting numerical values of the target higher-side current Ix2 and the target higher-side voltage Vx2 in the boosting circuit unit by using the microprocessor and converting numerical values of the inductive element current Ix and boosted detection voltage Vx by using the high-speed A/D converter, and a digital logic control function of performing negative feedback control so as to obtain a relationship in which a target value as which the numerical value is set is the same as a monitored present value into which the numerical value is converted, by using the boosting control circuit portion.

2. The in-vehicle engine control device according to claim 1, wherein the current detection resistor of the boosting circuit unit is connected to a position through which charging and discharging currents flow when the boosting opening and closing element is closed and thus the inductive element is excited and stores energy and when the boosting opening and closing element is opened and thus electromagnetic energy is released to the high-voltage capacitor, the boosting control circuit portion further includes a lower-side current set register; and a lower-side current comparator that compares the magnitudes of a numerical value stored in the low-side current set register and a numerical value stored in the current present value register, the logical circuit portion causes the boosting opening and closing element to be opened when the boosting opening and closing element is closed and thus a value of the inductive element current Ix is equal to or more than a value of the target higher-side current Ix2, and generates again the boosting control signal Ex when a value of the inductive element current Ix falls to pass a value of the target lower-side current Ix1 stored in the lower-side current set register, and the target lower-side current Ix1 stored in the lower-side current set register is individually set data which is transmitted from the microprocessor, or interlocked set data which is obtained by dividing the set data of the higher-side current set register by a predetermined magnification.

3. The in-vehicle engine control device according to claim 1, wherein the current detection resistor of the boosting circuit unit is connected to a position through which a storage charging current flows when at least the boosting opening and closing element is closed and thus the inductive element is excited and stores energy, the boosting control circuit portion further includes a cutoff time set timer having a time limit set register which is a comparison set register for addition clocking or a present value register for subtraction clocking, the logical circuit portion causes the boosting opening and closing element to be opened when the boosting opening and closing element is closed and thus a value of the inductive element current Ix is equal to or more than a value of the target higher-side current Ix2, and generates again the boosting control signal Ex when an open time of the boosting opening and closing element exceeds a cutoff time Toff set in the time limit set register, and a cutoff time Toff transmitted from the microprocessor or a fixed constant value is stored in the time limit set register.

4. The in-vehicle engine control device according to claim 1, wherein the boosting control circuit portion further includes a lower-side voltage set register; and a lower-side voltage comparator that compares the magnitudes of a numerical value stored in the lower-side voltage set register and a numerical value stored in the voltage present value register, the logical circuit portion invalidates the boosting control signal Ex such that the boosting opening and closing element is opened when the value of the boosted detection voltage Vx is equal to or more than a value of the target higher-side voltage Vx2, the logical circuit portion compares a value of the target lower-side voltage Vx1 stored in the lower-side voltage set register with a value of the boosted detection voltage Vx transmitted from the boosting circuit unit by using the lower-side voltage comparator, and makes the boosting control signal Ex valid such that the boosting opening and closing element is driven so as to be closed when a value of the boosted detection voltage Vx is smaller than a value of the target lower-side voltage Vx1, individually set data which is a value of the target lower-side voltage Vx1 transmitted from the microprocessor is stored in the lower-side voltage set register, or interlocked set data which is a value obtained by subtracting a predetermined difference value from a value of the target higher-side voltage Vx2 stored in the higher-side voltage set register is stored therein, and the difference value is larger than an increment voltage which is charged in the high-voltage capacitor through single current blocking of the inductive element, and is smaller than a discharged voltage Vx2−Vx0 of the high-voltage capacitor according to single rapid excitation for the electromagnetic coils.

5. The in-vehicle engine control device according to claim 1, wherein the logical circuit portion includes first and second flip-flop circuits; and a logical product element, the first flip-flop circuit is set when a value of the inductive element current Ix is equal to or less than a predetermined target lower-side current Ix1, or an open time of the boosting opening and closing element is equal to or more than a predetermined cutoff time Toff, and is reset when the value of the inductive element current Ix is equal to or more than the predetermined target higher-side current Ix2, the second flip-flop circuit is set when a value of the boosted detection voltage Vx is equal to or less than a value of a predetermined target lower-side voltage Vx1, and is reset when the value of the boosted detection voltage Vx is equal to or more than the predetermined target higher-side voltage Vx2, and the logical product element makes the boosting control signal Ex valid such that the boosting opening and closing element is driven so as to be closed when both of set outputs of the first and second flip-flop circuits are logic "1".

6. The in-vehicle engine control device according to claim 1, wherein the solenoid valve driving control circuit unit includes first and second low voltage opening and closing elements that connect the electromagnetic coils of a first group and the electromagnetic coils of a second group, alternately performing fuel injection, to the in-vehicle battery for each group;

first and second high voltage opening and closing element that are connected to an output of the boosting circuit unit;

opening and closing elements for power supply control that include a plurality of selective opening and closing elements individually connected to the electromagnetic coils; and first and second current detection resistors that are connected in series to the electromagnetic coils of the first and second groups, the injection control circuit unit generates the valve opening command signal INJn, and opening and closing command signals Drj including first and second high voltage opening and closing command signals A14 and A32 for the first and second high voltage opening and closing elements, first and second low voltage opening and closing command signals B14 and B32 for the first and second low voltage opening and closing elements, and selective opening and closing command signals CC1 to CC4 for the selective opening and closing elements, in response to a current detection signal Vex by the first and second current detection resistors, the current detection signal Vex is input to the injection control circuit unit as a current detection signal Dex which is digitally converted by the high-speed A/D converter, the multi-channel A/D converter is a sequential conversion type A/D converter which is operated at low speed, whereas the high-speed A/D converter is a delta sigma type A/D converter, and the arithmetic and control circuit unit is formed by an integrated circuit element of one chip or two chips including all of the multi-channel A/D converter, the high-speed A/D converter, the boosting control circuit portion, and the injection control circuit unit.

7. An in-vehicle engine control method using the in-vehicle engine control device according to claim 1, wherein the boosting control circuit portion measures a charging necessary time Tc after the valve opening command signals INJn are generated until a charged voltage of the high-voltage capacitor of the boosting circuit unit is reduced to the minimum voltage Vx0 due to rapid excitation for the electromagnetic coils and arrives at the target higher-side voltage Vx2 through recharging by using a boosting period measurement timer, or measures a charging allowance time Tb after the charged voltage arrives at the target higher-side voltage Vx2 until the next valve opening command signals INJn are generated by using a standby time measurement timer, a program memory cooperating with the microprocessor includes a control program which is current reduction adjusting means, the current reduction adjusting means calculates the present charging allowance time Tb based on a deviation Ts−Tc between the charging necessary time Tc previously measured by the boosting period measurement timer and a fuel injection interval Is until the next valve opening command signals INJn are generated, or reads the previous charging allowance time Tb measured standby time measurement timer so as to calculate the present charging allowance time Tb corresponding to the present fuel injection interval Ts, and the current reduction adjusting means corrects a value of the target higher-side current Ix2 transmitted to the higher-side current set register so as to be decreased when the present charging allowance time Tb is equal to or more than a predetermined value, corrects a value of the target higher-side current Ix2 so as to be increased when the present charging allowance time Tb is smaller than a predetermined value, and performs charging of the high-voltage capacitor by using a suppression target higher-side current Ix20.

8. The in-vehicle engine control method according to claim 7, wherein a clocking present value of the boosting period measurement timer is reset by a reset command signal RST which is obtained through a logical sum of rising signals of the valve opening command signals INJn generated by the microprocessor, the charging necessary time Tc is the time measured right after the reset is completed until a charged voltage of the high-voltage capacitor arrives at the target higher-side voltage Vx2, when the fuel injection interval Ts after the previous valve opening command signals INJn are generated until the present valve opening command signals INJn are generated is set as one valve opening cycle, the charging necessary time Tc in the previous valve opening cycle, measured by the boosting period measurement timer, is read by the microprocessor before the present valve opening command signals INJn are generated, and the boosted high voltage Vh, which is obtained by charging the high-voltage capacitor based on the target higher-side current Ix2 corrected by the current reduction adjusting means in the present valve opening cycle, is used for fuel injection in the next valve opening cycle.

9. The in-vehicle engine control method according to claim 7, wherein the standby time measurement timer measures a charging pause time which is time from a time point when a charged voltage of the high-voltage capacitor is reset before arriving at the target higher-side voltage Vx2 to a time point when the charged voltage is reduced to a predetermined threshold value or less due to rapid power supply to the electromagnetic coils and is thus required to be recharged after arriving at the target higher-side voltage Vx2, or time until the microprocessor generates the next valve opening command signals INJn, the predetermined threshold value is a target lower-side voltage Vx1 which is obtained by subtracting a difference value larger than a voltage drop due to self-discharge of the high-voltage capacitor from the target higher-side voltage Vx2 in the charging pause time, when the fuel injection interval Is after the previous valve opening command signals INJn are generated until the present valve opening command signals are generated is set as one valve opening cycle, the charging allowance time Tb in the previous valve opening cycle, measured by the standby time measurement timer, is read by the microprocessor before the present valve opening command signals INJn are generated, the boosted high voltage Vh, which is obtained by charging the high-voltage capacitor based on the target higher-side current Ix2 corrected by the current reduction adjusting means in the present valve opening cycle, is used for fuel injection in the next valve opening cycle.

10. The in-vehicle engine control method according to claim 7, wherein a program memory cooperating with the microprocessor includes a control program which is current rapid increase command means, the current rapid increase command means is operated based on an extent of depression of an accelerator pedal detected by an accelerator position sensor which is one analog sensor of a low-speed analog sensor group and a signal interval of an engine speed sensor which is one opening and closing sensor of an opening and closing sensor group, is executed when a rapid decrease of a fuel injection interval is predicted due to a rapid increase of the engine speed or a rapid decrease of a fuel injection interval is predicted due to a plurality of divided injections in a single fuel injection period, and is means for setting the target higher-side current Ix2 to be rapidly increased, at least two kinds of set values including a rated higher-side current Ix3 or an increase higher-side current Ix4 can be selected as a value of the target higher-side current set to be rapidly increased, the rated higher-side current Ix3 is a set current which is aimed at completion of charging of the high-voltage capacitor until the next rapid excitation moment even if a voltage of the in-vehicle battery is low and the engine speed is high, and the suppression target higher-side current Ix20 is a value equal to or less than the rated higher-side current Ix3, and the increase higher-side current Ix4 is applied when the divided injections are performed and is a short-time rated set current larger than the rated higher-side current Ix3.

11. The in-vehicle engine control method according to claim 7, wherein the injection control circuit unit includes at least one of a rapid excitation period measurement timer and a peak hold circuit of a rapid excitation current, a program memory cooperating with the microprocessor includes a control program which is boosted high voltage correction command means, the rapid excitation period measurement timer measures an actually measured arrival time Ta after a first or second high voltage opening and closing element connected between the boosting circuit unit and the first or second electromagnetic coils is driven so as to be closed until an excitation current Iex for the electromagnetic coils arrives at a targeted set cutoff current Ia, the peak hold circuit measures and stores an actually measured peak current Ip which is transiently overshot due to an opening response delay of the first or second high opening and closing element when an opening command is given to the first or second high voltage opening and closing element by the excitation current Iex arriving at the set cutoff current Ia, and then starts to be attenuated, and the boosted high voltage correction command means corrects a value of the target higher-side voltage Vx2 to a lower side within a predetermined limit when the actually measured arrival time Ta is shorter than a predetermined target arrival time Ta0, or the actually measured peak current Ip is larger than a predetermined target limitation peak current Ip0, and corrects a value of the target higher-side voltage Vx2 to a higher side within a predetermined limit when the actually measured arrival time Ta is longer than the predetermined target arrival time Ta0.

12. The in-vehicle engine control method according to claim 11, wherein the program memory cooperating with the microprocessor includes a control program which is valve opening period adjustment means, the valve opening period adjustment means is applied to a case where the actually measured arrival time Ta cannot be adjusted so as to be a predetermined target arrival time Ta0 within an increase and decrease correction limit of the target higher-side voltage Vx2 by the boosted high voltage correction command means, and the valve opening period adjustment means corrects a valve opening command generation period Tn which is a generation period of the valve opening command signals INJn so as to extend when rising of the rapid excitation current is late, and corrects the valve opening command generation period Tn so as to be shortened when rising of the rapid excitation current is early, such that the correction to a relationship for obtaining a targeted valve opening period is performed.

* * * * *